US011430436B2

(12) United States Patent
Kim

(10) Patent No.: US 11,430,436 B2
(45) Date of Patent: Aug. 30, 2022

(54) VOICE INTERACTION METHOD AND VEHICLE USING THE SAME

(71) Applicant: LG Electronics Inc., Seoul (KR)

(72) Inventor: Soryoung Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 260 days.

(21) Appl. No.: 16/485,118

(22) PCT Filed: Mar. 29, 2019

(86) PCT No.: PCT/KR2019/003711
§ 371 (c)(1),
(2) Date: Aug. 9, 2019

(87) PCT Pub. No.: WO2020/204213
PCT Pub. Date: Oct. 8, 2020

(65) Prior Publication Data
US 2021/0358492 A1    Nov. 18, 2021

(51) Int. Cl.
*G10L 15/22* (2006.01)
*B60W 40/08* (2012.01)
*B60W 50/10* (2012.01)
*G10L 15/06* (2013.01)
*G10L 15/08* (2006.01)
(Continued)

(52) U.S. Cl.
CPC ............ *G10L 15/22* (2013.01); *B60W 40/08* (2013.01); *B60W 50/10* (2013.01); *G10L 15/063* (2013.01); *G10L 15/08* (2013.01); *G10L 15/30* (2013.01); *G10L 21/0232* (2013.01); *G10L 21/0364* (2013.01); *B60W 60/001* (2020.02); *B60W 2540/21* (2020.02); *G10L 2015/088* (2013.01); *G10L 2015/223* (2013.01)

(58) Field of Classification Search
USPC .................. 704/246, 247, 251, 252, 275
See application file for complete search history.

(56) References Cited

U.S. PATENT DOCUMENTS

2014/0365222 A1    12/2014  Weider et al.
2017/0185263 A1     6/2017  Xie
(Continued)

FOREIGN PATENT DOCUMENTS

KR    20150047277    5/2015
KR    20160057458    5/2016
(Continued)

OTHER PUBLICATIONS

International Search Report in International Appln. No. PCT/KR2019/003711, dated Jan. 14, 2020, 5 pages (with English translation).
(Continued)

*Primary Examiner* — Leonard Saint Cyr
(74) *Attorney, Agent, or Firm* — Fish & Richardson P.C.

(57) ABSTRACT

A voice interaction method and a vehicle using the same are disclosed. A voice interaction method according to an embodiment of the present invention activates a personal terminal through which a voice signal of an occupant is received as a voice interaction assisting device between the vehicle and the occupant and changes presence or absence of a voice interaction between the vehicle and the occupant and voice interaction settings according to states of the vehicle and the occupant.

19 Claims, 15 Drawing Sheets

(51) Int. Cl.
  *G10L 15/30*   (2013.01)
  *G10L 21/0232*  (2013.01)
  *G10L 21/0364*  (2013.01)
  *B60W 60/00*   (2020.01)

(56) References Cited

U.S. PATENT DOCUMENTS

2017/0221480 A1* 8/2017 Tzirkel-Hancock ......................... B60W 50/10
2017/0300053 A1* 10/2017 Wengreen .............. G08G 1/202
2018/0210446 A1* 7/2018 Canavor ............ G01C 21/3617
2018/0321688 A1* 11/2018 Chase .................. G05D 1/0088
2018/0367895 A1* 12/2018 Smith ............... B60W 50/0098
2020/0216086 A1* 7/2020 Lenke .................. G05D 1/0088

FOREIGN PATENT DOCUMENTS

KR  20180014641  2/2018
KR  20180069660  6/2018
KR  20180122139  11/2018
KR  20190025350  3/2019

OTHER PUBLICATIONS

Notice of Allowance in Korean Appln. No. 10-2019-7019431, dated Aug. 30, 2021, 5 pages (with English translation).

* cited by examiner

【FIG. 1】
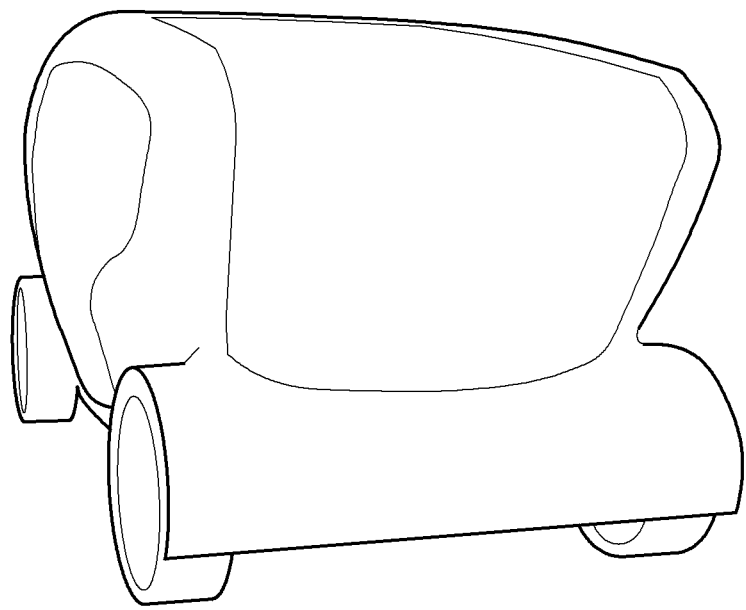
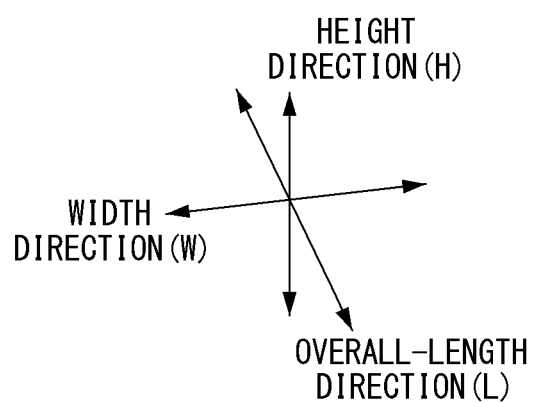

[FIG. 2]
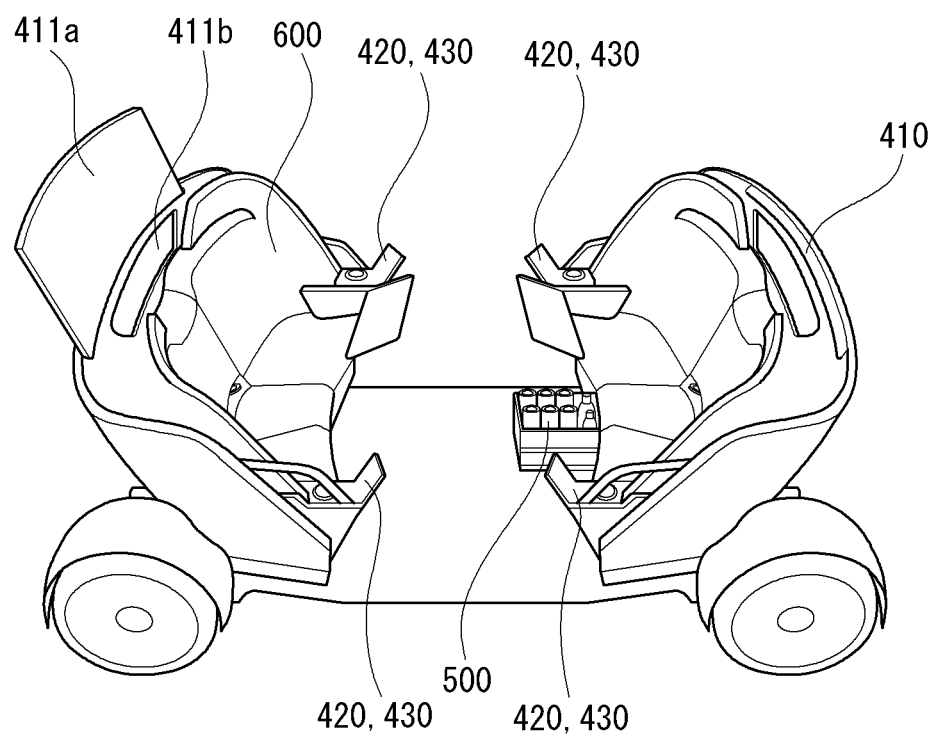

[FIG. 3]
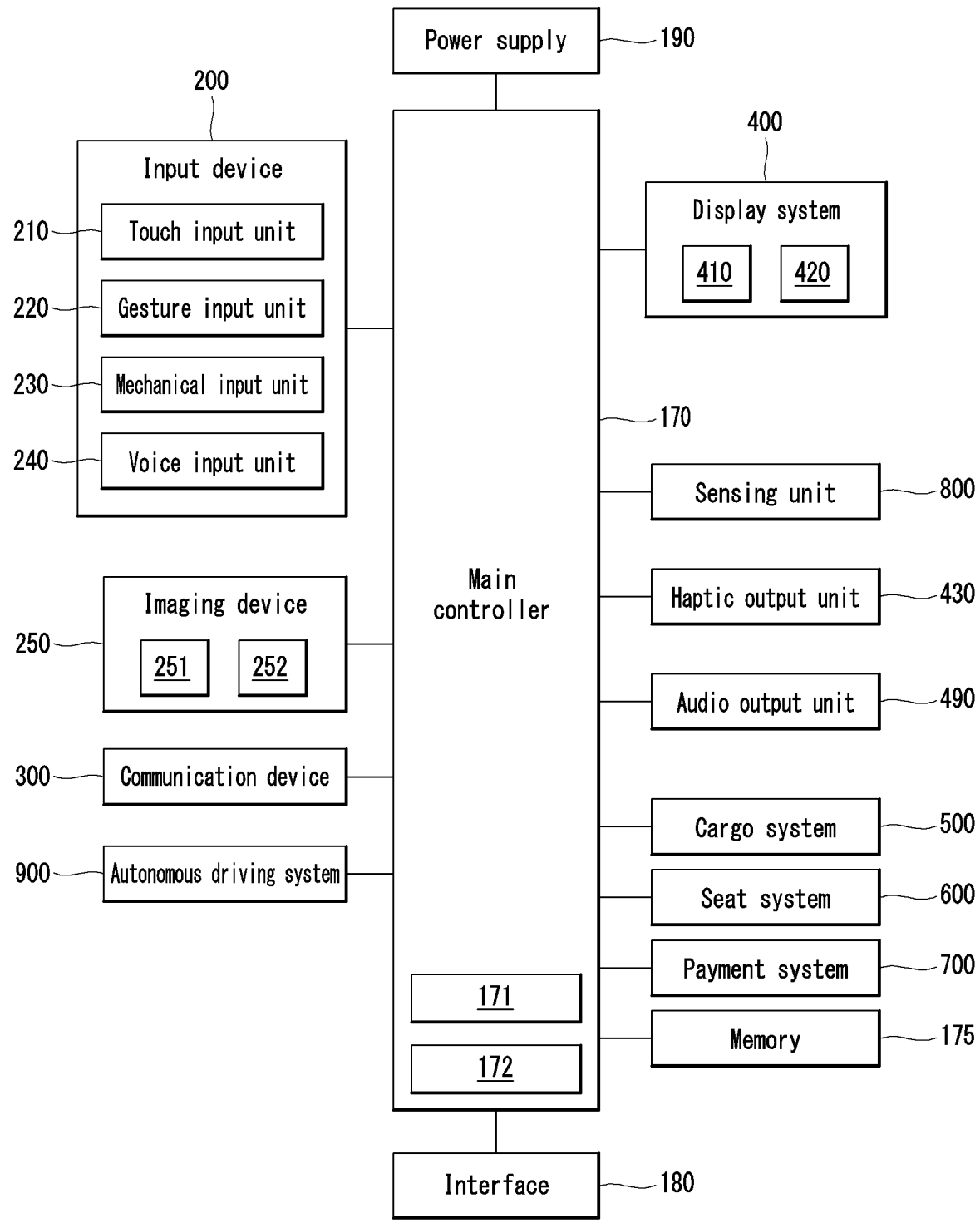

[FIG. 4A]
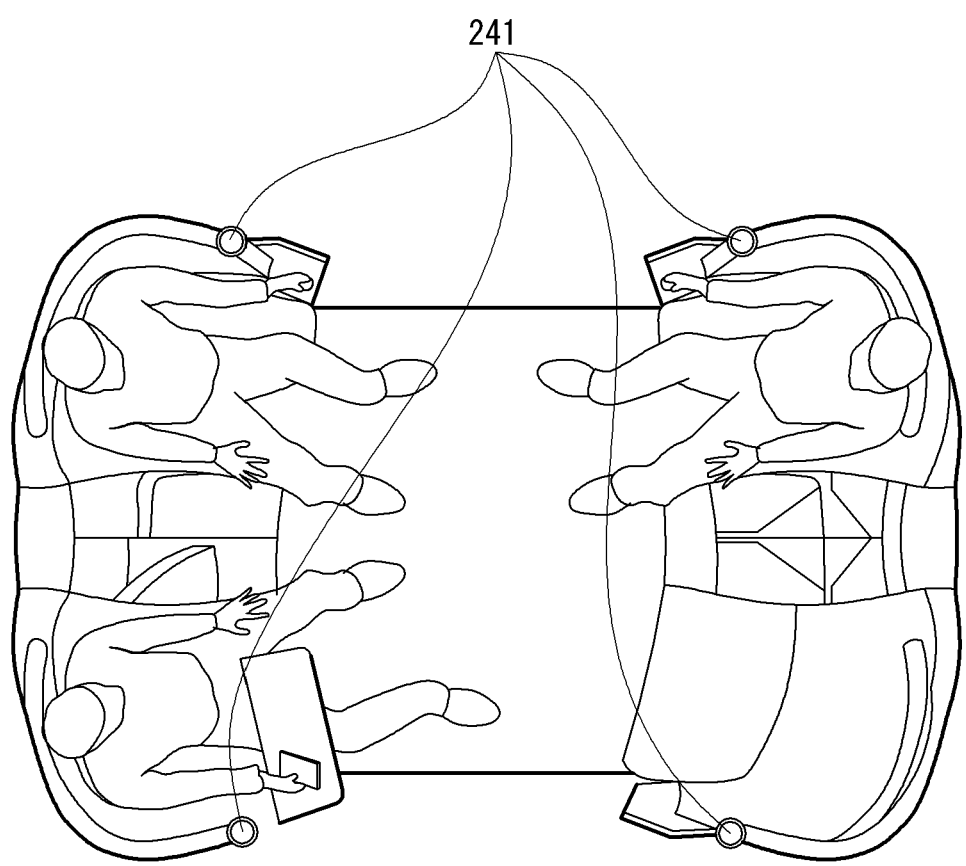

[FIG. 4B]
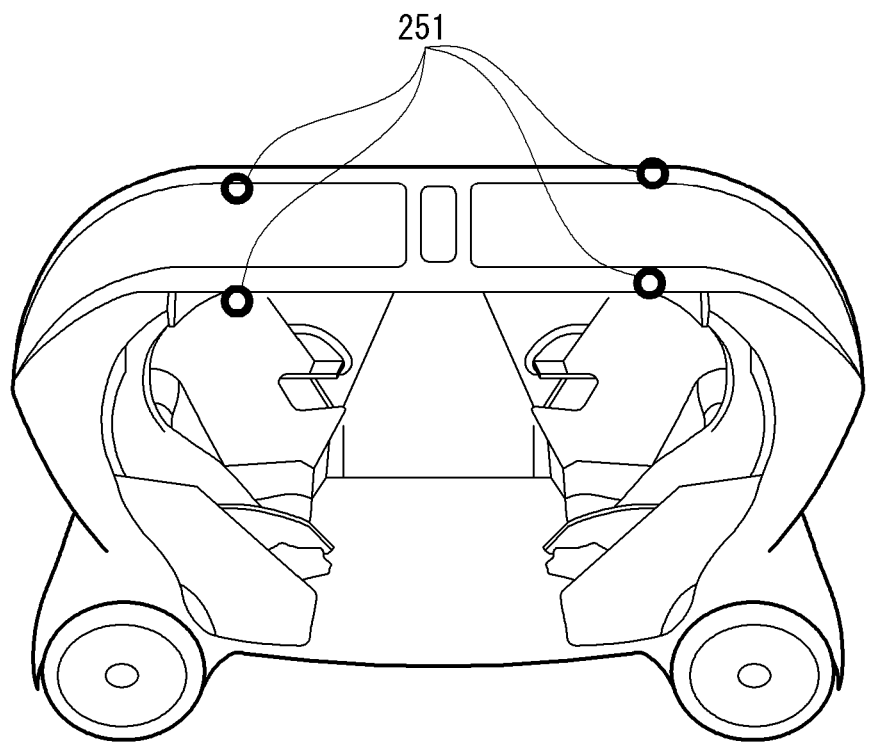
[FIG. 4C]
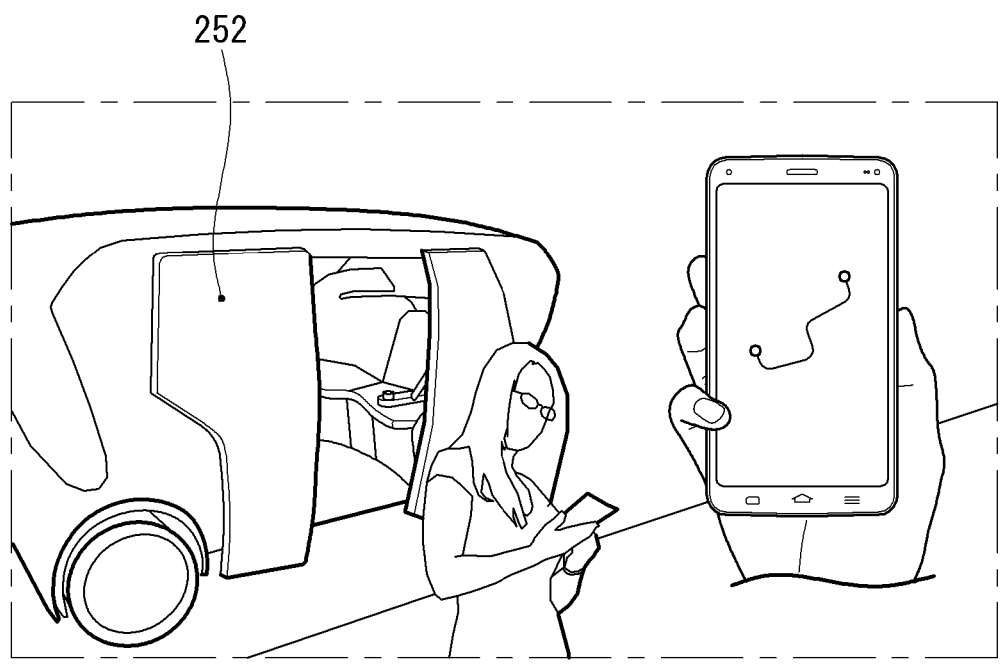

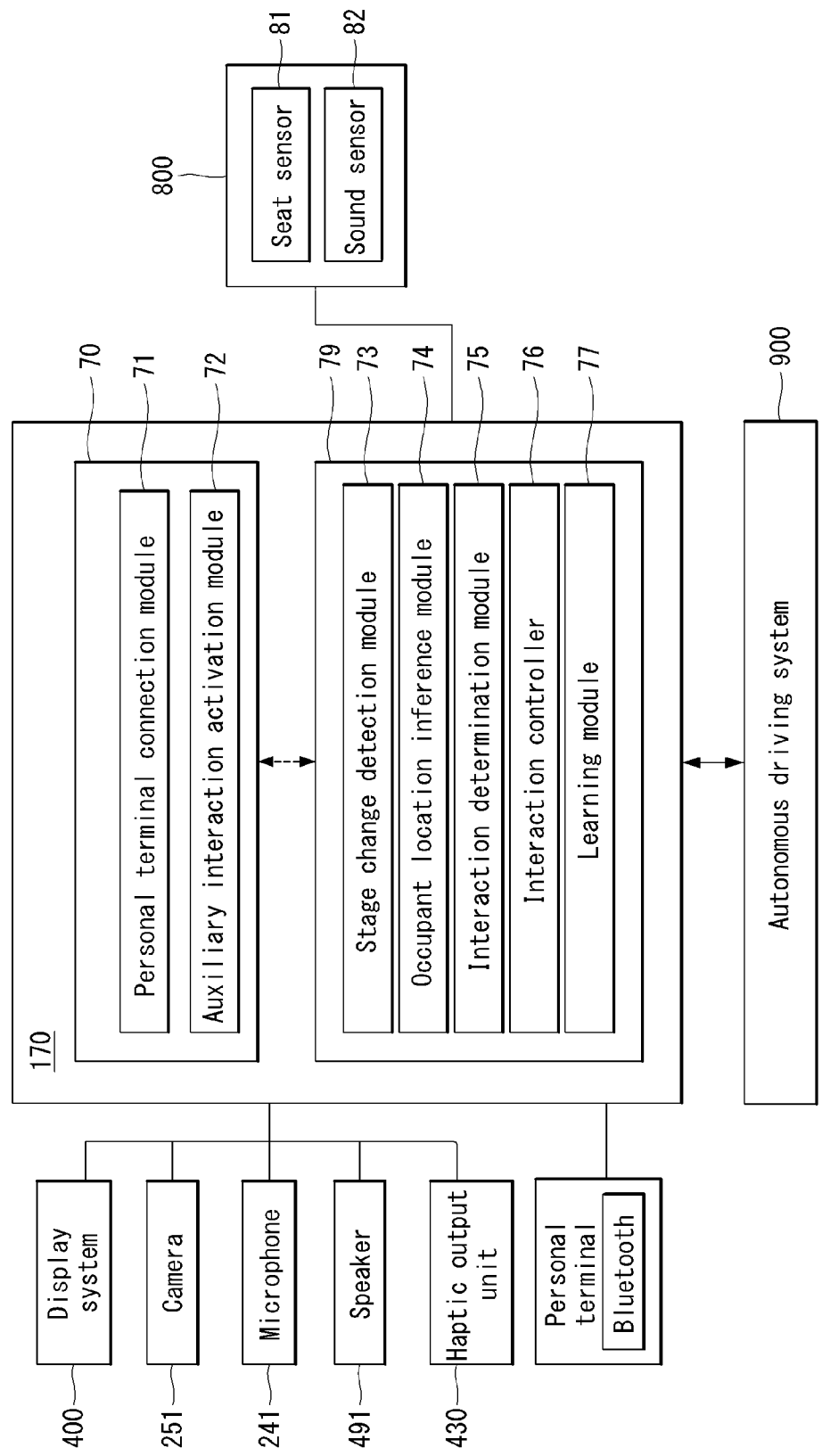
[FIG. 5]

[FIG. 6]
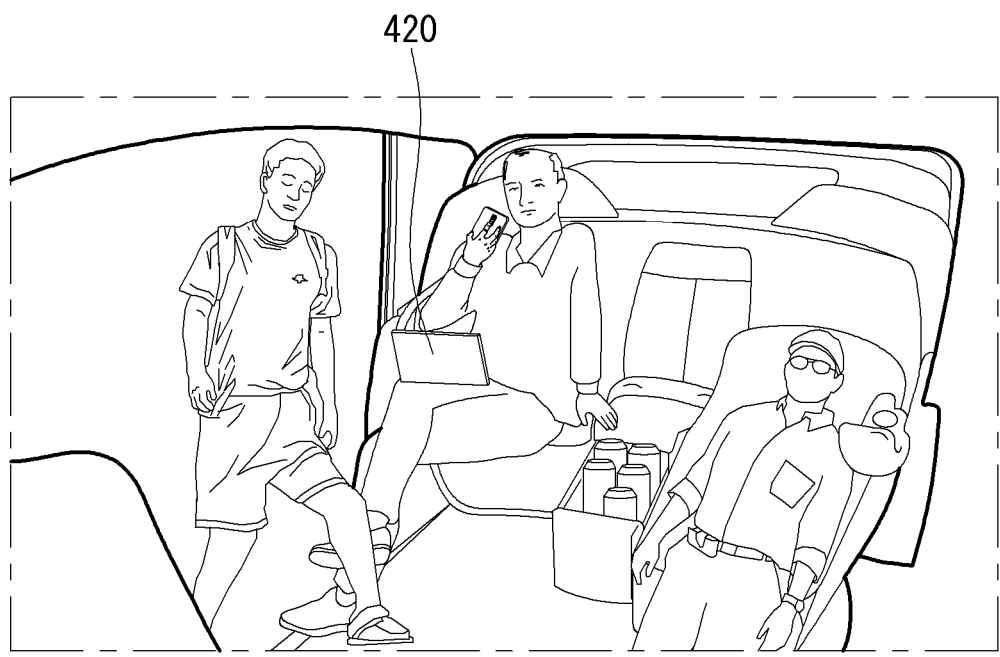

[FIG. 7]
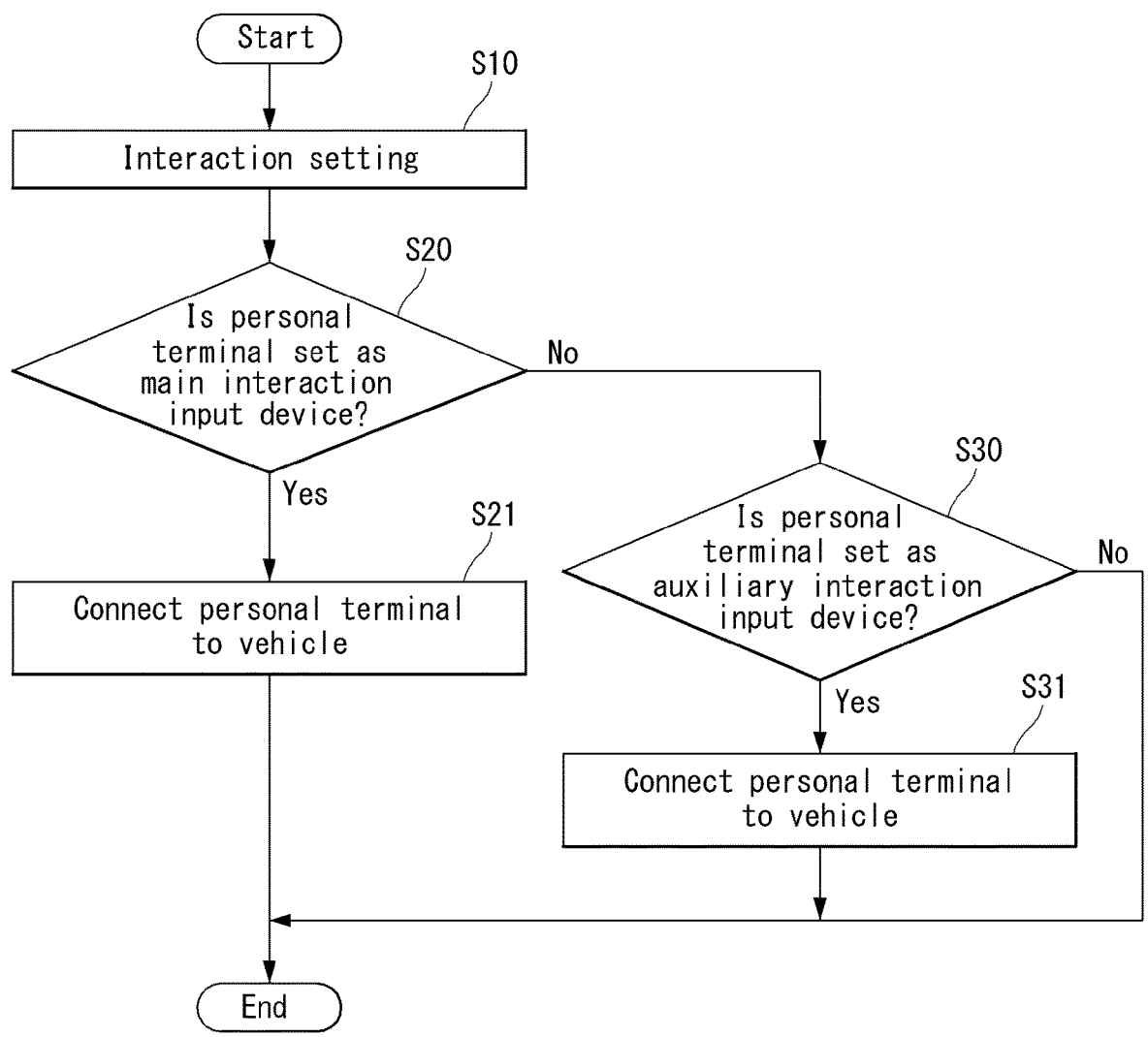

[FIG. 8]
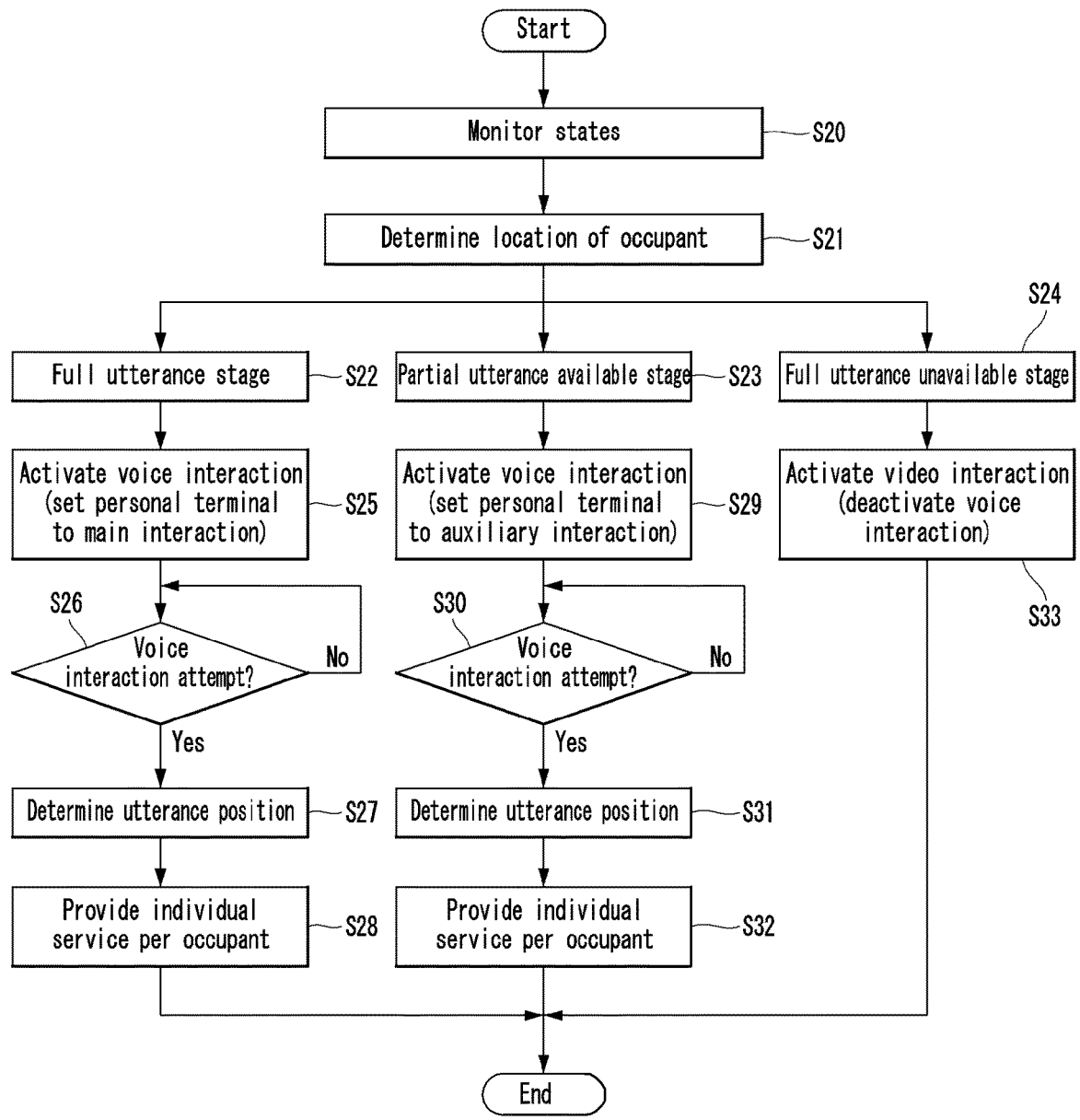

[FIG. 9]
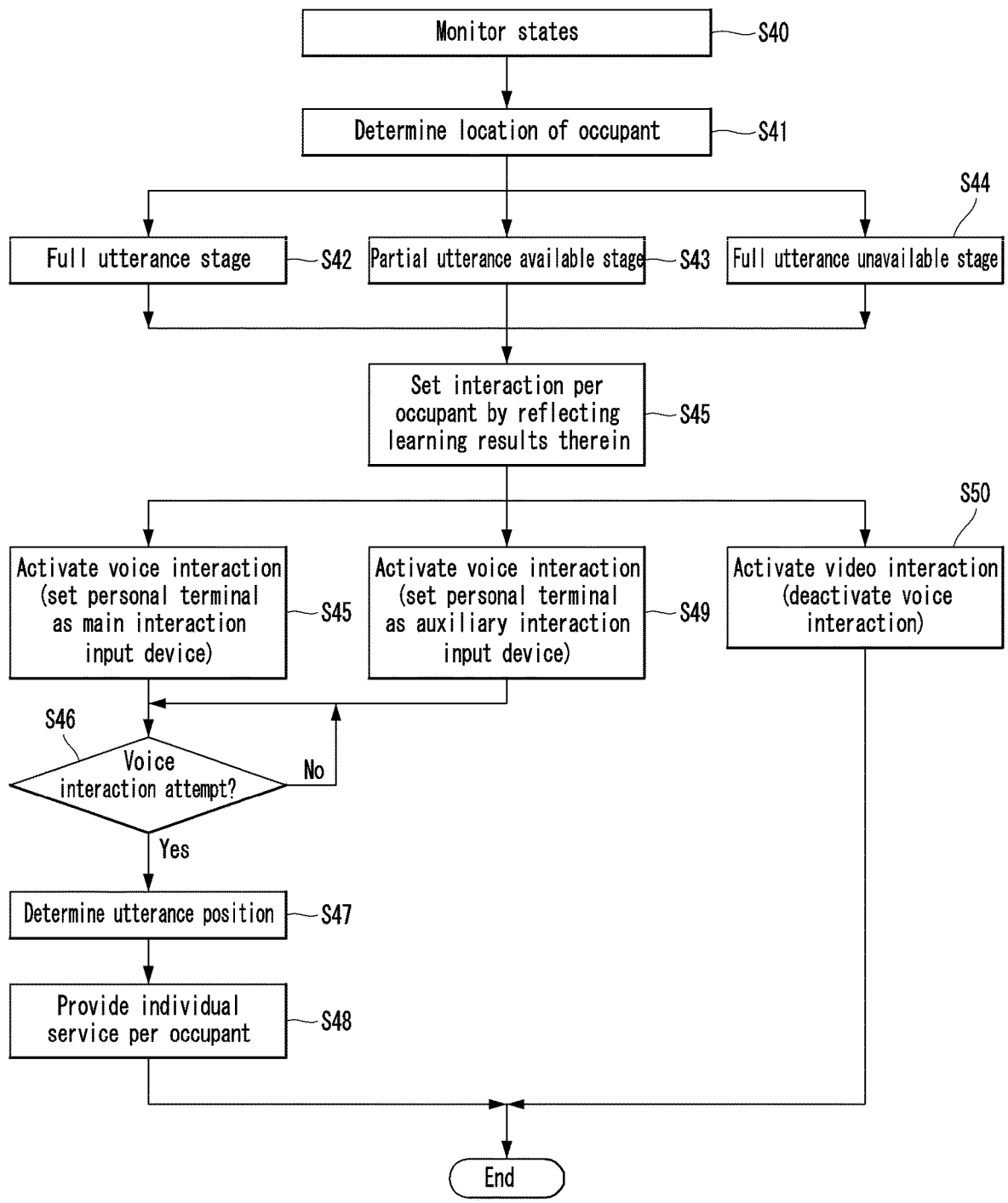

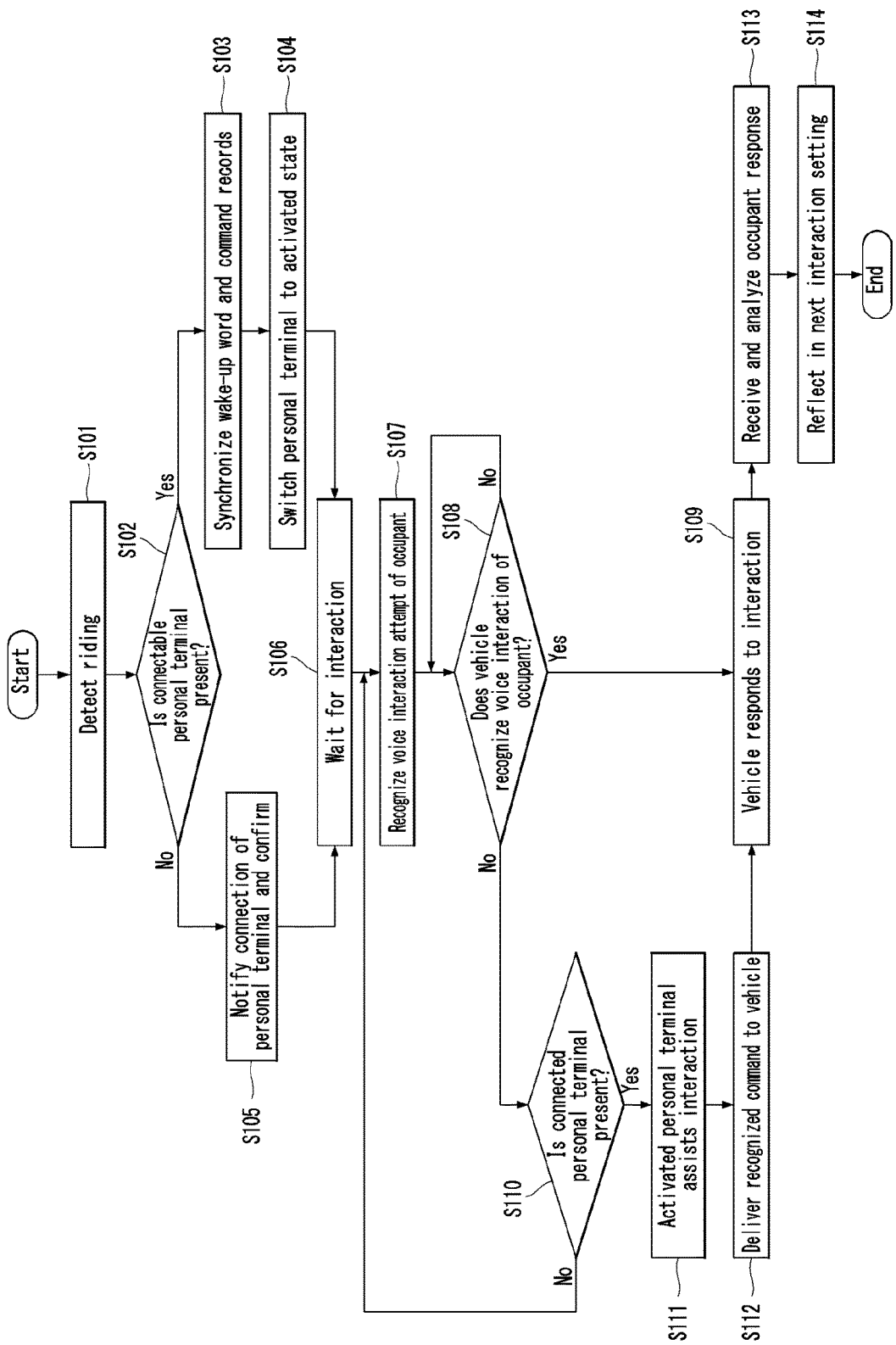

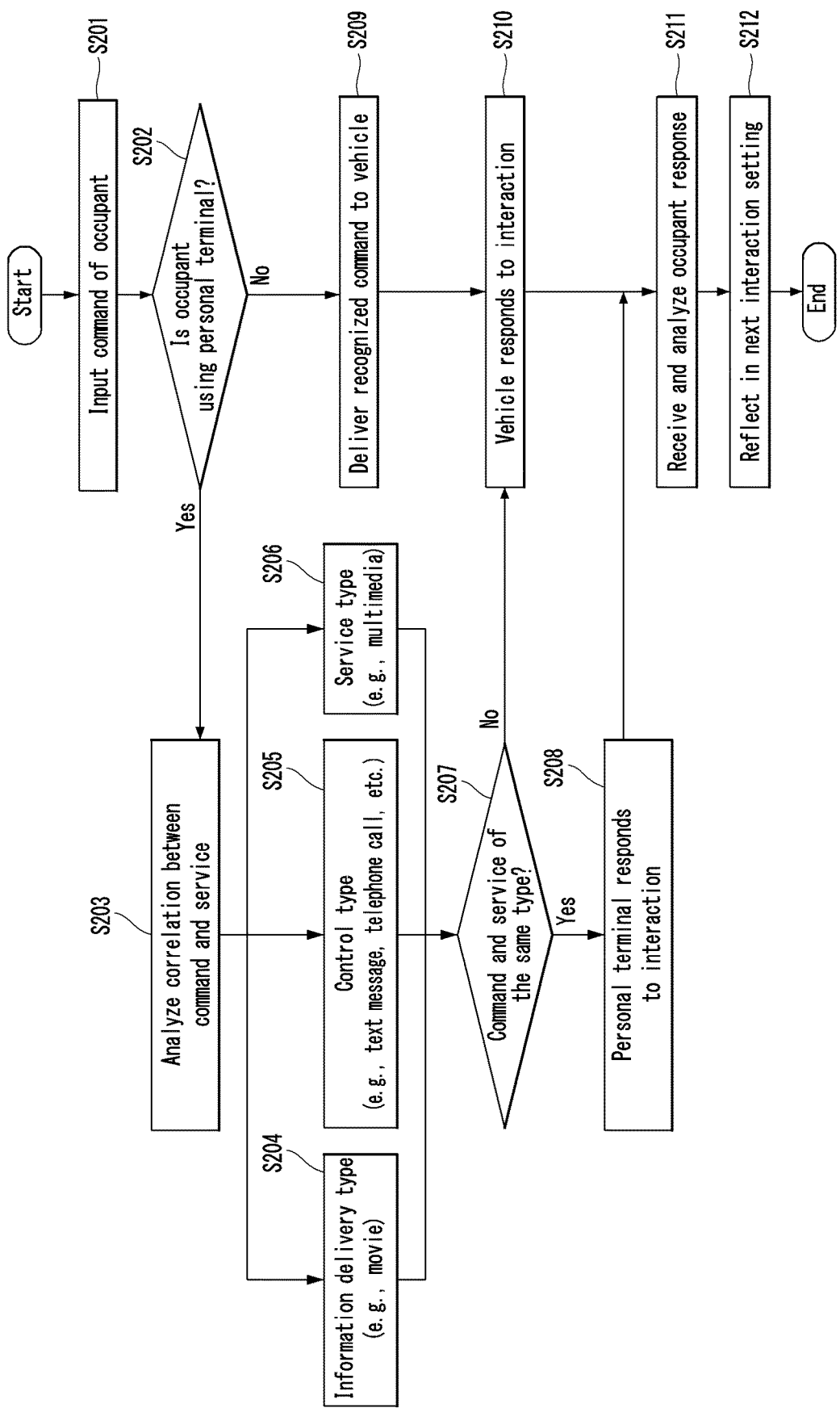
[FIG. 11]

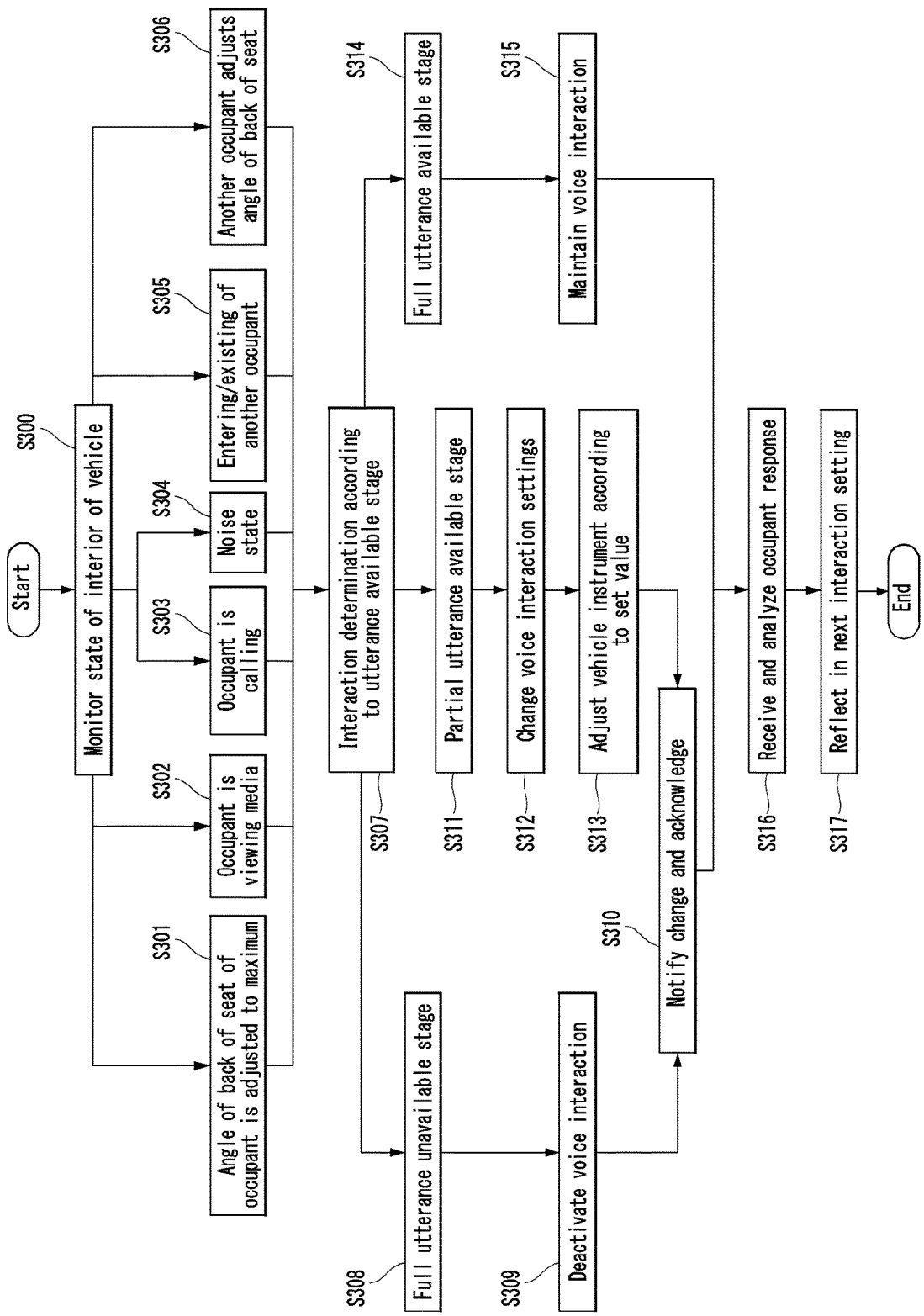

[FIG. 13]
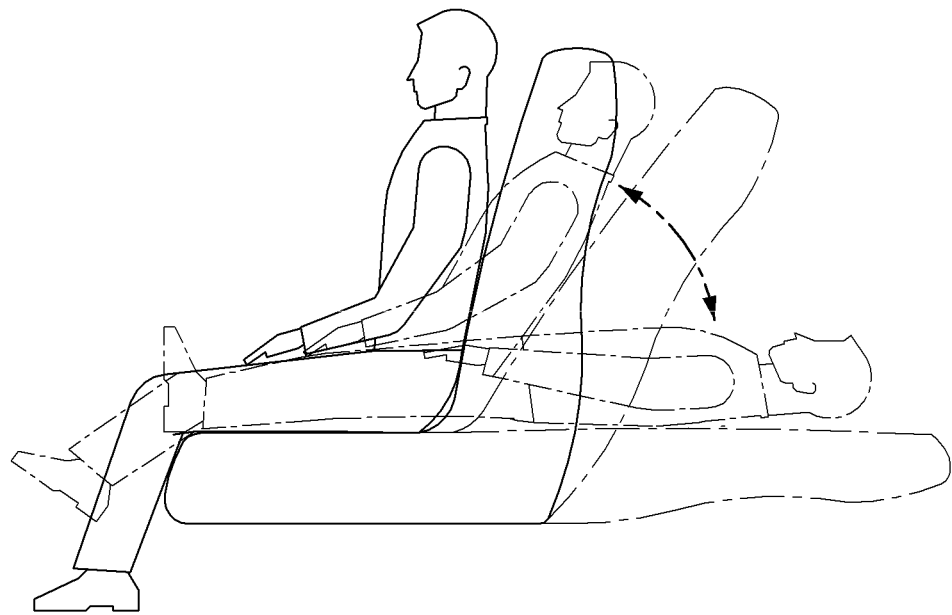
[FIG. 14A]
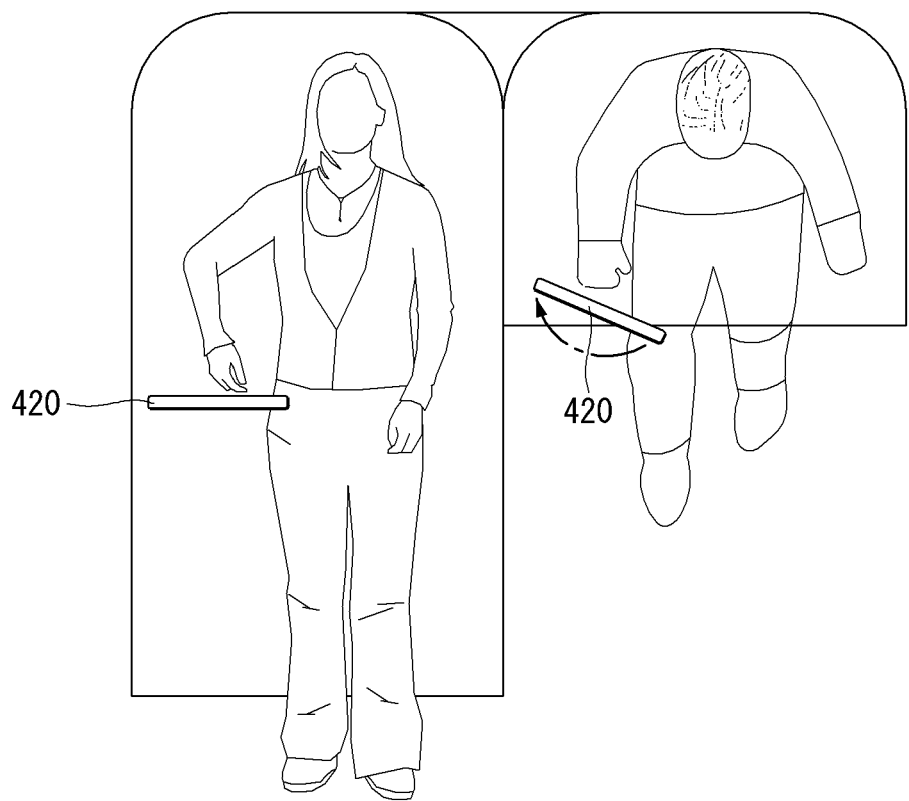

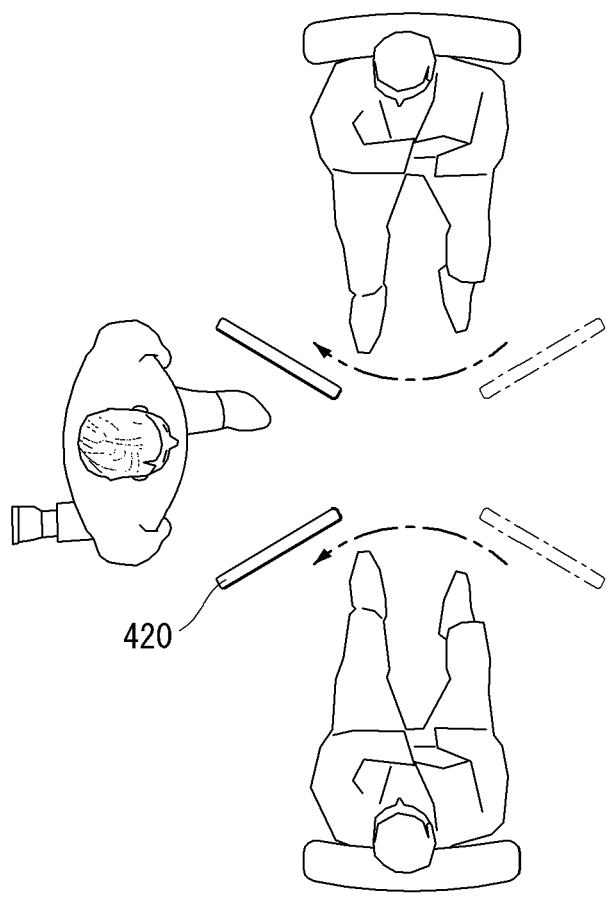
[FIG. 14B]

VOICE INTERACTION METHOD AND VEHICLE USING THE SAME

CROSS-REFERENCE TO RELATED APPLICATIONS

This application is a National Stage application under 35 U.S.C. § 371 of International Application No. PCT/KR2019/003711, filed on Mar. 29, 2019, the disclosure of which is hereby incorporated by reference in its entirety.

TECHNICAL FIELD

The present invention relates to a voice interaction method based on states of a vehicle and an occupant and a vehicle using the same.

BACKGROUND ART

Autonomous vehicles refer to vehicles that can travel without operations of drivers. Many manufacturers have already entered autonomous vehicle business and absorbed in research and development.

In the case of a share autonomous vehicle, a plurality of users can individually enter a vehicle at desired positions and exit the vehicle at their destinations.

DISCLOSURE

Technical Problem

Autonomous vehicles can support a voice interaction such that an occupant can execute a service provided by a vehicle using a voice.

While there are cases in which it is not necessary to provide a voice interaction according to utterance available state of an occupant in a vehicle, such situations are not considered.

When a voice interaction is attempted, voice input content is exposed to other occupants and thus a problem of invasion of privacy may be generated.

Accuracy of service request command delivery through a voice interaction may decrease according to states of an occupant and a vehicle.

Accordingly, an object of the present invention is to provide a voice interaction method which can improve voice interaction accuracy and a vehicle using the same.

Another object of the present invention is to provide a voice interaction method which can reinforce privacy protection and a vehicle using the same.

Still another object of the present invention is to provide a voice interaction method which can improve satisfaction of all occupants and a vehicle using the same.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

To accomplish the aforementioned objects, a voice interaction method according to at least one embodiment of the present invention includes: monitoring states of a vehicle and an occupant in real time; activating a personal terminal for receiving a voice signal of the occupant as a voice interaction assisting device between the vehicle and the occupant; and changing presence or absence of a voice interaction and voice interaction settings between the vehicle and the occupant according to the states of the vehicle and the occupant.

A vehicle according to at least one embodiment of the present invention includes: an interaction connection device connected to a personal terminal for receiving a voice signal of an occupant through a communication channel to activate the personal terminal as a voice interaction assisting device between the vehicle and the occupant; and a voice interaction device for monitoring states of the vehicle and the occupant in real time and changing presence or absence of a voice interaction and voice interaction settings between the vehicle and the occupant according to the states of the vehicle and the occupant.

Advantageous Effects

The present invention can improve the accuracy of a voice interaction between an occupant and a vehicle using a personal terminal of the occupant as a voice interaction assisting device in the voice interaction between the occupant and the vehicle.

The present invention can protect privacy of an occupant by allowing a voice interaction between the occupant and a vehicle through a personal terminal of the occupant.

The present invention can improve satisfaction of an occupant for services provided by a vehicle by adaptively changing a voice interaction through real-time monitoring of states of the vehicle and the vehicle.

The present invention can infer an utterance point for each occupant and discriminate between occupants who attempt voice interactions to prevent misrecognition of voice interactions between occupants.

DESCRIPTION OF DRAWINGS

FIG. 1 is a diagram showing the exterior of a vehicle according to an embodiment of the present invention.

FIG. 2 is a diagram showing the interior of the vehicle according to an embodiment of the present invention.

FIG. 3 is a block diagram showing a cabin system for a vehicle according to an embodiment of the present invention.

FIGS. 4A to 4C are diagrams showing an input device according to an embodiment of the present invention.

FIG. 5 is a diagram showing an interaction device according to an embodiment of the present invention.

FIG. 6 is a diagram showing an example in which an occupant enters/exits a cabin and a certain occupant is lying.

FIG. 7 is a flowchart showing an interaction setting method using a personal terminal.

FIGS. 8 and 9 are flowcharts showing an interaction control method using a personal terminal in a full utterance available stage, a partial utterance available stage and a full utterance unavailable stage.

FIG. 10 is a flowchart showing an interaction setting method using a personal terminal when an occupant enters a vehicle.

FIG. 11 is a flowchart showing a method of selecting an interaction target device on the basis of analysis of correlation between commands and service types in the interaction control method using a personal terminal.

FIG. 12 is a flowchart showing a method of changing interaction settings according to an indoor space of a vehicle and an occupant state.

FIG. 13 is a diagram showing an example in which the angle of the back of a seat of a vehicle is varied.

FIGS. 14A and 14B are diagrams showing examples in which a display is rotated such that the back of the display faces other occupants.

BEST MODE

The advantages, features and methods for accomplishing the same of the present invention will become more apparent through the following detailed description with respect to the accompanying drawings. However, the present invention is not limited by embodiments described blow and is implemented in various different forms, and the embodiments are provided so that this disclosure will be thorough and complete, and will fully convey the scope of the invention to those skilled in the art. The present invention is defined by the scope of the claims.

Shapes, sizes, ratios, angles, numbers, etc. shown in the figures to describe embodiments of the present invention are exemplary and thus are not limited to particulars shown in the figures. Like numbers refer to like elements throughout the specification. In the following description, if a detailed description of known techniques associated with the present invention would unnecessarily obscure the gist of the present invention, detailed description thereof will be omitted It will be further understood that when the terms "include", "have" and "comprise" are used in this specification, other parts may be added unless "~ only" is used. An element described in the singular form is intended to include a plurality of elements unless context clearly indicates otherwise.

The terms "module" and "unit or part" used to signify components are used herein to help the understanding of the components and thus they should not be considered as having specific meanings or roles.

It will be understood that, when an element is referred to as being "connected to", "coupled to", "on" or "under" another element, it can be "directly" on or under another element or can be "indirectly" formed such that an intervening element is also present.

It will be understood that although the terms first, second, etc. may be used herein to describe various elements, these elements should not be limited by these terms. These terms are generally only used to distinguish one element from another.

A singular representation may include a plural representation unless it represents a definitely different meaning from the context.

A vehicle as described in this specification may include all of an internal combustion engine vehicle including an engine as a power source, a hybrid vehicle including both an engine and an electric motor as a power source, and an electric vehicle including an electric motor as a power source. Although embodiments will be described below focusing on an autonomous vehicle, the vehicle of the present invention is not limited to the autonomous vehicle. For example, the present invention is applicable to vehicles supporting voice interaction.

Each occupant can request a service from a vehicle supporting voice interaction through a voice. According to the voice interaction of the present invention, states of a vehicle and an occupant can be monitored in real time and a voice command of the occupant can be delivered to the vehicle through a personal terminal according to the states of the vehicle and the occupant.

Hereinafter, a personal terminal refers to a terminal of an individual occupant which can perform a voice interaction with a vehicle. The personal terminal may include one or more of a portable terminal and a headset carried by an occupant (or a user), and a personal terminal provided at each seat of a vehicle. The portable terminal may be a terminal that can be used for telephone call and multimedia playback, for example, a smartphone.

The personal terminal can be used as an assisting device for delivering input of an occupant (user) to a vehicle in an interaction process between the vehicle and the occupant. The occupant (user) can input a voice or a text to the personal terminal to attempt an interaction with the vehicle. An occupant can input a text to a personal terminal and a vehicle can provide a service to each occupant in response to the text received through the personal terminal. The occupant can input a voice command to the personal terminal close to the mouse, and the vehicle can provide a service desired by the occupant in response to the voice signal or command of the occupant received through the personal terminal.

In the following embodiment, the personal terminal may be set as a main interaction input device or an auxiliary interaction input device in an interaction between an occupant and a vehicle.

When the personal terminal is set as the main interaction input device, the personal terminal receives a voice signal of an occupant and decodes the voice signal to generate a command code to which each device of the vehicle can respond. A command code of an occupant input to the vehicle through the personal terminal can directly control output devices of the vehicle, for example, a display device, an audio output unit, a cargo system, and the like.

When the personal terminal is set as the auxiliary interaction input device, the personal terminal delivers a voice signal (voice command) of the occupant to the vehicle. The vehicle decodes the voice signal of the occupant received from the personal terminal to generate a command code and output devices of the vehicle respond to the command of the occupant.

In the present invention, the personal terminal can assist an interaction between an occupant and a vehicle such that a command of the occupant can be delivered to the vehicle in various situations in which the interaction between the occupant and the vehicle is not easily performed. The vehicle of the present invention can improve voice interaction accuracy and provide services to each occupant without invasion of privacy and without affecting other occupants by using the personal terminal as an interaction assisting device.

The following embodiments may be combined as a whole or in part and various interoperations and operations are technically possible. Embodiments may be independently implemented or implemented in connection with each other.

Hereinafter, various embodiments of the present invention will be described in detail with reference to the attached drawings.

Referring to FIG. 1, a vehicle 10 may include a power train driver which controls a power train, a chassis driver which controls a chassis, a door driver which controls doors, a safety apparatus driver which controls various safety devices, a lamp driver which controls various lamps, an air-conditioner driver which controls an air conditioner.

Various drivers included in the vehicle 10 can be explained as electronic devices. According to an embodiment, the vehicle 10 may further include components other than components described in the specification or may not include some of the components described in the specification.

The vehicle 10 may include at least one object detection device which detects an object outside the vehicle. The object detection device may include at least one of a camera, a radar, a lidar, an ultrasonic sensor and an infrared sensor. The object detection device may provide object detection data generated on the basis of an output signal of a sensor to at least one electronic device included in the vehicle.

The vehicle 10 may include a personal terminal of an occupant and at least one communication device for exchanging signals with external devices of the vehicle. The communication device can exchange signals with at least one of infrastructure (e.g. a server) and another vehicle.

The vehicle 10 may include an internal communication system. A plurality of electronic devices included in the vehicle 10 can exchange signals through the internal communication system. The internal communication system may use at least one communication protocol (e.g., CAN, LIN, FlexRay, MOST and Ethernet).

The vehicle 10 may include a cabin system 100 illustrated in FIGS. 2 and 3.

Referring to FIGS. 2 and 3, the cabin system 100 for a vehicle (hereinafter referred to as a "cabin system") includes various comforts for users who use the vehicle 10.

The cabin system 100 includes a display system 400, a cargo system 500, a seat system 600, a payment system 700, a sensing unit 800, an autonomous driving system 900, etc.

The cabin system 100 may further include a main controller 170, a memory 175, an interface 180, a power supply 190, an input device 200, an imaging device 250, a communication device 300, the display system 400, a haptic output unit 430, an audio output unit 490, the cargo system 500, the seat system 600 and the payment system 700. According to an embodiment, the cabin system 100 may further include components other than the components described in the specification or may not include some of the components described in the specification.

The power supply 190 can provide power to the components of the cabin system 100. The power supply 190 can be provided with power from a power source (e.g., a battery) and provide power to each unit of the cabin system 100. The power supply 190 can operate according to a control signal provided from the main controller 170. For example, the power supply 190 may be realized as a switched-mode power supply (SMPS).

The main controller 170 can be electrically connected to the input device 200, the communication device 300, the display system 400, the cargo system 500, the seat system 600 and the payment system 700 and control these components by exchanging signals therewith.

The main controller 170 may be realized as at least one of an application specific integrated circuit (ASIC), a digital signal processor (DSP), a digital signal processing device (DSPD), a programmable logic device (PLD), a field programmable gate array (FPGA), a processor, a controller, a micro-controller, a microprocessor, and an electronic unit for executing other functions.

The main controller 170 may include at least one sub-controller or include a plurality of sub-controllers according to an embodiment. The components of the cabin system 100 may be grouped by function or on the basis of seats on which users can sit. A plurality of sub-controllers can individually control grouped devices and systems.

The main controller 170 may include at least one processor 171. Although the main controller 170 includes one processor 171 in the example of FIG. 3, the main controller 170 may include a plurality of processors. The processor 171 may be classified as one of the aforementioned sub-controllers.

The main controller 170 can acquire information on each occupant through the communication device 300. For example, a portable terminal (or a mobile terminal) of a first occupant can transmit first information to the cabin system 100. A portable terminal of a second occupant can transmit second information to the cabin system 100. The communication device 300 can receive the first information and the second information and provide the first information and the second information to the processor 171.

The main controller 170 can identify each occupant on the basis of reservation information of occupants or image data received from at least one of an internal camera 251 and an external camera 252. Reservation information of an occupant includes a time at which the occupant enters/exits the vehicle, a seat position, and the like.

The main controller 170 can identify an occupant on the basis of at least one of route information, body information, co-passenger information, baggage information, position information, preferred content information, preferred food information, information on whether the occupant has a disability, and use history information of the occupant.

The main controller 170 can provide a control signal to at least one of a display and a speaker such that content is provided to occupants on the basis of an electrical signal generated by the input device 200.

The main controller 170 can determine a seat of an occupant on the basis of reservation information of the occupant or user information received from a portable terminal of the occupant. The main controller 170 can determine whether the occupant sits on a seat and a location of the occupant on the basis of the reservation information of the occupant and sensor signals such as a signal of a weight sensor provided in a vehicle seat and a signal of an angle sensor of a vehicle seat.

The main controller 170 can determine a service fee on the basis of an electrical signal received from at least one of the communication device 300, the internal camera 251, the external camera 252, the input device 200, a display of the display system 400, a speaker of the audio output unit 490, the cargo system 500, and a plurality of seats of the seat system 600.

The main controller 170 may include an artificial intelligence agent (hereinafter referred to as "AI agent") 172. The AI agent 172 can perform machine learning on the basis of data acquired through the input device 200. The AI agent 172 can control at least one of the display system 400, the audio output unit 490, the cargo system 500, the seat system 600 and the payment system 700 on the basis of machine learning results to provide a service optimized for each occupant.

The AI agent 172 is connected to an interaction device between the vehicle and an occupant and can improve satisfaction of each occupant by analyzing and learning satisfaction of the occupant in an interaction between the vehicle and the occupant.

The input device 200 includes at least one of a touch input unit 210, a gesture input unit 220, a mechanical input unit 230 and a voice input unit 240.

The input device 200 can receive user input. The input device 200 can convert the user input into an electrical signal. The electrical signal converted by the input device 200 may be converted into a control signal and provided to at least one of the display system 400, the audio output unit 490, the cargo system 500, the seat system 600 and the payment system 700. The main controller 170 or at least one processor included in the cabin system 100 can generate a control signal based on an electrical signal received from the input device 200.

The input device 200 may include at least one of the touch input unit 210, the gesture input unit 220, the mechanical input unit 230 and the voice input unit 240.

The touch input unit 210 can convert a touch input of a user into an electrical signal. The touch input unit 210 may include at least one touch sensor for detecting a touch input of a user. According to an embodiment, the touch input unit 210 may realize a touchscreen by being integrated with at least one display included in the display system 400. The touchscreen may provide an input interface and an output interface between the cabin system 100 and a user together.

The gesture input unit 220 can convert a gesture input of a user into an electrical signal. The gesture input unit 220 may include at least one of an infrared sensor and an image sensor for detecting a gesture input of a user. According to an embodiment, the gesture input unit 220 may detect a three-dimensional gesture input of a user. To this end, the gesture input unit 220 may include a plurality of light output units outputting infrared light or a plurality of image sensors. The gesture input unit 220 can detect a three-dimensional gesture input of a user through Time of Flight (TOF), structured light or disparity.

The mechanical input unit 230 can convert a physical input (e.g., press or rotation) of a user through a mechanical device into an electrical signal. The mechanical input unit 230 may include at least one of a button, a dome switch, a jog wheel and a jog switch.

The gesture input unit 220 and the mechanical input unit 230 may be integrated. For example, the input device 200 may include a jog dial device that includes a gesture sensor and is formed such that it can be inserted/ejected into/from a neighboring structure (e.g., at least one of a seat, an armrest and a door). When the jog dial device is in parallel to the neighboring structure, the jog dial device can serve as the gesture input unit 220. When the jog dial device is protruded from the neighboring structure, the jog dial device can serve as the mechanical input unit 230.

The voice input unit 240 can convert a voice input of a user into an electrical signal. The voice input unit 240 may include at least one microphone 241 installed in each seat and provided per occupant as shown in FIG. 4A. The voice input unit 240 may include a beam forming microphone.

The imaging device 250 may include at least one camera. The imaging device 250 may include at least one of the internal camera 251 and the external camera 252. The internal camera 251 can capture an image of a cabin space of the vehicle 10. The external camera 252 can capture an image of the outside of the vehicle.

The main controller 170 can detect a motion of each occupant on the basis of an image acquired by the internal camera 251 and control at least one of the display system 400, the audio output unit 490, the cargo system 500, the seat system 600 and the payment system 700 on the basis of the detected motion.

The main controller 170 can authenticate a user on the basis of an image acquired by the external camera 252 or acquire body information (e.g., height information, weight information, and the like) of the user, co-passenger information of the user, cargo information of the user, and the like.

The memory 175 is electrically connected to the main controller 170. The memory 175 can store basic data, control data and input/output data with respect to the components constituting the cabin system 100. The memory 175 can store various types of data for the overall operation of the cabin system 100, such as a program for processing or control of the main controller 170. The memory 175 may be integrated with the main controller 170. The memory 175 may include at least one of a ROM, a RAM, an EPROM, a flash drive and a hard drive.

The interface 180 can exchange signals with at least one electronic device included in the vehicle 10 in a wired or wireless manner. The interface 180 can be configured as a communication module, a terminal, a pin, a cable, a port, a circuit, an element and a device.

The communication device 300 can exchange signals with an external device in a wireless manner. The communication device 300 can exchange signals with an external device through a network or directly exchange signals with the external device. The external device may include at least one of a server, a portable terminal and other vehicles. The communication device 300 can exchange signals with at least one personal terminal.

The communication device 300 may include at least one of an antenna for performing communication, a radio frequency (RF) circuit which can realize at least one communication protocol, and an RF element. According to an embodiment, the communication device 300 may use a plurality of communication protocols. The communication device 300 may switch communication protocols according to a distance to a mobile terminal.

The communication device 300 may include a short range communication unit, a positional information unit, a V2X communication unit, an optical communication unit, a broadcast transceiver, and the like.

The short range communication unit connects a channel for short range communication. The short range communication unit can support short range communication using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (Wireless USB).

The short range communication unit may form a wireless area network to perform short range communication between the vehicle 10 and at least one external device. The external device may include a portable terminal of an occupant.

The positional information unit acquires positional information of the vehicle 10. The positional information unit may include a global positioning system (GPS) module or a differential global positioning system (DGPS) module.

The V2X communication unit performs communication (V2I: Vehicle to Infrastructure) with a server, communication (V2V: Vehicle to Vehicle) with other vehicles or communication (V2P: Vehicle to Pedestrian) with a pedestrian. The V2X communication unit may include an RF circuit that can realize V2I, V2V and V2P communication protocols.

The optical communication unit performs communication with external devices through light. The optical communication unit may include a light transmitter that converts an electrical signal into an optical signal and transmits the optical signal to the outside, and a light receiver that converts a received optical signal into an electrical signal. The light transmitter may be integrated with a lamp of the vehicle 10.

The broadcast transceiver receives broadcast signals from an external broadcast management server or transmits broadcast signals to the broadcast management server through broadcast channels. Broadcast channels may include satellite channels and terrestrial channels. Broadcast signals may include TV broadcast signals, radio broadcast signals and data broadcast signals.

Although FIG. 3 illustrates direct connection of the communication device 300 to the main controller 170, the communication device 300 may be connected to the main controller 170 through the interface 180.

The display system 400 can display video signals. The display system 400 may include a first display device 410 and a second display device 420.

The display system 400 outputs a video signal received from at least one of the main controller 170, the input device 200, the imaging device 250, the communication device 300 and the autonomous driving system 900 on a screen of a display panel.

The first display device 410, 411a and 411b includes at least one shared display that outputs visual content. The first display device 410, 411a and 411b is realized as at least one of a flat display, a curved display, a rollable display and a flexible display and may include a screen exposed to two or more occupants.

A first display panel 410 of the first display device is positioned at the back of a seat on one side of the cabin and installed such that it can be inserted/ejected into/from the cabin. Second and third display panels 411a and 411b are positioned at the back of a seat on the other side of the cabin and installed such that they can be inserted/ejected into/from the cabin. The first display device may further include a rollable display provided on the ceiling of the cabin.

The second display panel 411a can display information on a driving situation of the vehicle 10. The driving situation information may include at least one of information on an object outside the vehicle, navigation information and vehicle state information. The information on an object outside the vehicle may include information on presence or absence of an object, information on the location of an object, information on a distance between the vehicle 10 and an object, and information on a relative speed of the vehicle 10 with respect to an object. The navigation information may include at least one of map information, destination information, route information according to destination setting, information about various objects on a route, lane information and information on a current location of the vehicle. The vehicle state information may include vehicle attitude information, vehicle speed information, vehicle tilt information, vehicle weight information, vehicle direction information, vehicle battery information, vehicle fuel information, vehicle tire pressure information, vehicle steering information, vehicle indoor temperature information, vehicle indoor humidity information, pedal position information and vehicle engine temperature information. The third display panel 411b can be defined as a user interface area. For example, the third display panel 411b can output an AI agent screen.

The second display device 420 may include a plurality of display panels provide for respective seats, as shown in FIG. 2, to provide a common or independent visual content service per occupant. The second display device 420 is realized as at least one of a flat display, a curved display, a rollable display and a flexible display. The display panels of the second display device 420 are separated for respective seats. The first display panel of the second display device 420 can be used as a dedicated display for a first occupant sitting on a first seat. The second display panel of the second display device 420 can be used as a dedicated display for a second occupant sitting on a second seat.

Each display panel of the second display device 420 may be provided at an armrest of a seat such that only one occupant can check displayed contents. The second display device 420 can display a video signal corresponding to personal information of a user. Each display panel of the second display device 420 can realize a touchscreen by forming a layer structure with a touch sensor or being integrated with the touch sensor. The second display device 420 can display a graphic object for receiving a user input for seat adjustment or indoor temperature adjustment.

The second display device 420 may be used as a video interaction device for each occupant. An occupant can input a command to the vehicle by touching a touchscreen of a service providing screen displayed on the second display device 420 in a video interaction.

The display devices 410, 411a and 411b can provide hologram content. For example, the second display device 420 can provide hologram content per user such that only an occupant who requests a content playback service can view the corresponding content.

Although FIG. 3 illustrates direct connection of the display system 400 to the main controller 170, the display system 400 may be connected to the main controller 170 through the interface 180.

The haptic output unit 430 can provide a haptic interface per occupant using a vibration motor provided per seat, as shown in FIG. 2.

The audio output unit 490 can convert an electrical signal into an audio signal. The audio output unit 490 may include at least one speaker that converts an electrical signal into an audio signal and outputs the audio signal. For example, the audio output unit 490 may include a plurality of speakers provided for respective seats on which occupants can sit.

The cargo system 500 can provide articles to a user at the request of the user. The cargo system 500 can operate on the basis of an electrical signal generated by the input device 200 or the communication device 300. The cargo system 500 can include a cargo box. The cargo box can be hidden in a part of the bottom of a seat with articles loaded therein. When the cargo system 500 receives a request of an occupant, the cargo box can be exposed to the cabin. The occupant can select a necessary article from articles loaded in the cargo box. The cargo system 500 may include a sliding moving mechanism and an article pop-up mechanism for exposing the cargo box according to user input. The cargo system 500 may include a plurality of cargo boxes in order to provide various kinds of articles. The cargo box may include a weight sensor for determining whether an article has been provided.

Although FIG. 3 illustrates direct connection of the cargo system 500 to the main controller 170, the cargo system 500 may be connected to the main controller 170 through the interface 180.

The seat system 600 can provide a customized seat for each occupant. The seat system 600 can operate on the basis of an electrical signal generated by the input device 200 or the communication device 300. The seat system 600 can adjust at least one element of a seat on the basis of body information of an occupant received from the input device 200 or the communication device 300. The seat system 600 can determine whether an occupant sits on a seat and a location of the occupant on the basis of a seat sensor signal.

The seat system 600 can include a plurality of seats on which a plurality of occupants can sit or lie. One of the plurality of seats can be arranged such that it faces at least another one. At least two occupants can sit facing each other in the cabin. The angle of the back of each seat of the vehicle can be varied as shown in FIG. 13. The angle of the back may be varied in the range of 90 to 180 degrees with respect to the floor, the present invention is not limited thereto.

Although FIG. 3 illustrates direct connection of the seat system 600 to the main controller 170, the seat system 600 may be connected to the main controller 170 through the interface 180.

The payment system 700 calculates a service fee for each occupant and transmits the service fee to a portable terminal of the occupant to perform charging processing. The processor 171 can provide a signal to the payment system 700 such that a determined service fee is charged. The payment system 700 can calculate a price for at least one service used by an occupant in response to a payment request signal from at least one of the input device 200, the communication device 300 and the cargo system 500 and request payment of the calculated price.

Although FIG. 3 illustrates direct connection of the payment system 700 to the main controller 170, the payment system 700 may be connected to the main controller 170 through the interface 180.

The sensing unit 800 includes various sensors for sensing a vehicle state, a driving state, a vehicle location/attitude, and the like in real time and informing the components of the cabin system 100 of the sensing results. The sensing unit 800 may include a seat sensor. The seat sensor may include sensors such as a pressure sensor and an angle sensor. The pressure sensor senses pressure applied to a seat and the angle sensor senses an angle of the back of a seat.

The sensing unit 800 can sense a vehicle state. The sensing unit 800 may include a posture sensor, a collision sensor, a wheel sensor, a speed sensor, an inclination sensor, a weight sensor, a heading sensor, a yaw sensor, a gyro sensor, a position module, a vehicle forward/reverse movement sensor, a battery sensor, a fuel sensor, a tire sensor, a steering sensor according to steering wheel rotation, a vehicle internal temperature sensor, a vehicle internal humidity sensor, an ultrasonic sensor, an illumination sensor, an acceleration pedal position sensor, a brake pedal position sensor, etc. The posture sensor may include a yaw sensor, a roll sensor, a pitch sensor, and the like.

The sensing unit 800 can detect vehicle attitude information, vehicle collision information, vehicle direction information, vehicle location information (GPS information), vehicle heading information, vehicle speed information, vehicle acceleration information, vehicle tilt information, vehicle forward/reverse movement information, battery information, fuel information, tire information, vehicle lamp information, vehicle internal temperature information, vehicle internal humidity information, a steering wheel rotation angle, illumination outside the vehicle, pressure applied to an acceleration pedal, pressure applied to a brake pedal, and the like in real time to generate sensing signals.

The sensing unit 800 may further include an acceleration pedal sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS), etc.

The autonomous driving system 900 autonomously travels to a predetermined destination through a predetermined route while recognizing objects around the vehicle by being connected to the communication device 300 and communicating with other vehicles and external devices. The autonomous driving system 900 can stop at a pickup location and a destination designated by each occupant.

The vehicle 10 can operate in a manual mode, a self-driving mode, or a remote control mode. In the self-driving mode, the controller 170 or an operation system directly controls the vehicle 10 without intervention of a driver to drive the vehicle 10 to a destination set by the driver. In the remote control mode, an external device controls the vehicle 10 without intervention of a driver. An occupant or a user can select the manual mode, the self-driving mode or the remote control mode by inputting a mode selection/switching command through a personal terminal or directly inputting the command into the cabin system 100.

The autonomous driving system 900 can be enabled in the self-driving mode to automatically control an object detection device, a driving operation device, a vehicle driving device, a safety apparatus driver, an operation system, and a navigation system such that the vehicle 10 can travel in the self-driving mode. When the self-driving mode switches to the manual mode, the autonomous driving system 900 is disabled. In the manual mode, the vehicle 10 can travel according to a manual operation of a driver.

The object detection device detects objects located outside the vehicle 10 using the external camera of the imaging device 250, a radar, a lidar, an ultrasonic sensor, an infrared sensor or the like. Objects may be various objects related to driving of the vehicle 10. For example, objects may include lanes, other vehicles, pedestrians, two-wheeled vehicles, traffic signals, light, roads, structures, speed bumps, geographic features, animals, and the like.

Lanes include a traveling lane, a lane next to a traveling lane, and a lane of a vehicle traveling in an opposite direction. A lane includes left and right lines defining the lane. Other vehicles may be vehicles traveling around the vehicle 10. Other vehicles may be vehicles located within a predetermined distance from the vehicle 10. Other vehicles may be preceding vehicles or following vehicles of the vehicle 10.

A pedestrian may be a person located around the vehicle 10. The pedestrian may be a person located within a predetermined distance from the vehicle 10. For example, the pedestrian may be a person located on a sidewalk or a road. A two-wheeled vehicle may refer to a vehicle located around the vehicle 10 and moving using two wheels. The two-wheeled vehicle may be a motorcycle or a bicycle located on a sidewalk or a road around the vehicle 10.

Traffic signals may include traffic lights, traffic signs, and patterns or text on road surfaces.

Light may be light radiated from lamps of other vehicles or street lamps or sunlight (natural light). Roads may include a road surface, a curve, and inclination of an uphill road and a downhill road. Structures may be objects located around roads and fixed to the ground. For example, structures may include street lamps, roadside trees, buildings, telegraph poles, traffic lights, and bridges. Geographic features may include mountains, hills and the like.

Objects may be divided into a moving object and a fixed object. The moving object may be other vehicles, a two-wheeled vehicle, a pedestrian or the like. The fixed object may be a traffic signal, a road or a fixed structure.

The driving operation device may include a steering input device, an acceleration input device and a brake input device.

The steering input device receives a traveling direction command for the vehicle 10 and transmits the traveling direction command to the vehicle driving device. The steering input device can be realized as a steering wheel, a touchscreen, a touch pad or a button.

The acceleration input device receives an acceleration command for the vehicle 10 and transmits the acceleration command to the vehicle driving device. The brake input device receives a deceleration and stop command for the vehicle 10 and transmits the deceleration and stop command to the vehicle driving device. The acceleration input device and the brake input device may be realized in the form of a pedal, a touchscreen, a touch pad or a button.

The vehicle driving device may include a power train driver, a chassis driver, a door/window driver, a safety apparatus driver, a lamp driver and an air-conditioner driver.

The power train driver can control the operation of a power train device. The power train driver can include a power source driver and a transmission driver.

The power source driver controls a power source of the vehicle 10. When a fossil fuel based engine is a power source, the power source driver can control an engine output torque under the control of the main controller 170 or the autonomous driving system 900. The power source driver can adjust an engine output torque. When an electric energy based motor is a power source, the power source driver 610 can adjust a rotation speed, a torque and the like of the motor under the control of the main controller 170 or the autonomous driving system 900.

The transmission driver controls a transmission. The transmission driver can adjust a state of the transmission to forward, reverse, neutral or park. When an engine is a power source, the transmission driver can adjust a gear engagement state in a forward state.

The chassis driver can control the operation of a chassis. The chassis driver can include a steering driver, a brake driver and a suspension driver.

The steering driver can perform electronic control on a steering apparatus in the vehicle 10. The steering driver can change a driving direction of the vehicle.

The brake driver can perform electronic control on a brake apparatus in the vehicle to reduce the speed of the vehicle 10. The brake driver can individually control a plurality of brakes. The brake driver can differently control brake power applied to a plurality of wheels.

The suspension driver can perform electronic control on a suspension apparatus in the vehicle 10. The suspension driver can control the suspension apparatus such that vibration of the vehicle 10 is reduced when a road has an uneven surface. The suspension driver can individually control a plurality of suspensions.

The door/window driver can perform electronic control on a door apparatus or a window apparatus in the vehicle 10. The door/window driver can include a door driver 631 and a window driver 632. The door driver can control a door apparatus. The door driver can control opening/closing of a plurality of doors included in the vehicle 10. The door driver can control opening or closing of a trunk or a tail gate. The door driver can control opening or closing of a sunroof. The window driver can perform electronic control on a window apparatus to control opening or closing of a window of the vehicle 10.

The safety apparatus driver can perform electronic control on various safety apparatuses in the vehicle 10. The safety apparatus driver can include an airbag driver, a seatbelt driver and a pedestrian protection apparatus driver.

The airbag driver performs electronic control on an airbag apparatus in the vehicle 10 to control an airbag such that the airbag is unfolded in a dangerous situation.

The seatbelt driver can perform electronic control on a seatbelt apparatus in the vehicle 10 to control a seatbelt such that an occupant is fixed to a seat using the seatbelt in a dangerous situation.

The pedestrian protection apparatus driver performs electronic control on a hood lift and a pedestrian airbag to control the airbag for hood lift up and airbag unfolding when a collision with a pedestrian is detected.

The lamp driver performs electronic control on various lamp apparatuses in the vehicle 10. The air-conditioner driver performs electronic control on an air conditioner in the vehicle to control the interior temperature of the vehicle.

The operation system controls operation of the vehicle 10. The operation system can be enabled in the self-driving mode. The operation system can include a driving system, a departing system and a parking system.

The operation system may be realized in a software manner. In this case, the operation system may be a software program executed under the control of the main controller 170 or the autonomous driving system 900.

The driving system provides navigation information from the navigation system to the vehicle driving device. The driving system provides object information from the object detection device to the vehicle driving device. The driving system can provide a signal received from an external device through the communication device 300 to the vehicle driving device.

The departing system performs departing of the vehicle. The departing system can provide navigation information from the navigation system to the vehicle driving device. The departing system can provide object information from the object detection device to the vehicle driving device. The departing system can provide a signal received from an external device through the communication device to the vehicle driving device.

The parking system can perform parking of the vehicle 10. The parking system can provide navigation information from the navigation system to the vehicle driving device as a control signal. The parking system can provide object information from the object detection device to the vehicle driving device. The parking system can provide a signal received from an external device through the communication device 300 to the vehicle driving device.

The navigation system can generate navigation information. The navigation information may include one or more of map information, set destination information, information on a route to a destination, information about various objects on a route, lane information and information on a current location of the vehicle.

The navigation system can receive information from an external device through the communication device 300 and update previously stored information.

FIG. 4A shows a microphone 241 provided for each seat. FIGS. 4B and 4C show external cameras 251 and 252 in the vehicle.

FIG. 5 is a diagram showing an interaction device of a vehicle according to an embodiment of the present invention.

Referring to FIG. 5, the interaction device 170 of the vehicle includes an interaction connection device 70 and a voice interaction device 79. The voice interaction device 79 can be connected to the AI agent 172 to use some functions of the AI agent 172.

The voice interaction device 79 includes a state change detection module 73, an occupant location inference module 74, an interaction determination module 75, an interaction controller 76, and a learning module 77.

The interaction connection device 70 includes a personal terminal connection module 71 and auxiliary interaction activation module 72.

The personal terminal connection module 71 connects a personal terminal to the AI agent 172 through a communication device 300 when the personal terminal is used as an assistive device in an interaction between an occupant and the vehicle.

The auxiliary interaction activation module 72 activates a personal terminal as a voice interaction assisting device according to interaction settings.

The state change detection module 73 detects an indoor space state of the cabin in which occupants are located on the basis of an indoor space image of the cabin captured by the camera 251, output signals of the microphone 241 and a sound sensor 82, and an output signal of a seat sensor 81.

An occupant may sit or lie on a seat in the indoor space of the cabin. An occupant may select a seat position in the vehicle when reserving riding in the vehicle. The state change detection module 73 can detect an occupant entering/exiting the vehicle, a location and a position of an occupant, whether an occupant is sleeping, or the like on the basis of an image captured by the camera 251 and an output signal of the seat sensor 81. The state change detection module 73 can detect an indoor space noise level of the vehicle using one or more of the microphone 241 and the sound sensor 82.

An indoor space state of the cabin and an occupant state affect a voice interaction. For example, enter/exiting the vehicle, a location of an occupant, a noise level, whether an occupant is viewing multimedia content, whether an occupant is using a making a call, or the like may cause a voice interaction to be impossible or bring about voice interaction failure due to voice recognition rate decrease.

The occupant location inference module 74 determines a location of each occupant and an utterance position of an occupant who attempts a voice interaction on the basis of one or more of an output signal of the microphone 241 or the sound sensor 82, an output signal of the camera 251 and reservation information of occupants. The occupant location inference module 74 can identify an occupant who attempts a voice interaction with the vehicle by inferring an utterance position in the vehicle.

The interaction controller 76 receives information on locations of occupants and an utterance position from the occupant location inference module 74, identifies an occupant who attempts a voice interaction with the vehicle 10 and provides a service to the occupant in response to a voice command of the occupant. Accordingly, the vehicle can provide a service per occupant in response to a voice command of each occupant received through a voice interaction.

The interaction determination module 75 determines a voice interaction recognition level on the basis of changes in states of the vehicle and an occupant detected by the state change detection module 73. The voice interaction recognition level can be divided into a full utterance unavailable stage, a partial utterance available stage and a full utterance stage.

The full utterance unavailable stage is a state in which a voice interaction is impossible. For example, when an occupant is making a call using a personal terminal or viewing multimedia content, this occupant cannot perform a voice interaction. Further, when an occupant is lying down and sleeping, a voice interaction from this occupant does not occur. In other words, the interaction determination module 75 can determine one of a state in which a personal terminal is connected to a call, a state in which the personal terminal receives a multimedia content request from an occupant, a state in which the angle of the back of a seat on which an occupant sits is greater than a predetermined angle, and a state in which the position of an occupant is a horizontal position as the full utterance unavailable stage.

When the interaction determination module 75 determines a voice interaction recognition level as the full utterance unavailable stage, the interaction controller 76 can transmit an interaction change notice message such as "Voice interaction will be deactivated according to change in the current state of the occupant. Intersection is possible through the display" to the occupant. This notice message can be output through a display device, a speaker or the like in the vehicle or transmitted to a personal terminal of an occupant determined to be in the utterance unavailable stage. In addition, the interaction controller 76 can output an interaction change completion notice message through a display in the vehicle or vibration (or haptic) or transmit the interaction change completion notice message to a personal terminal immediately after deactivation of the voice interaction is completed.

The partial utterance available stage is a state in which a voice recognition rate decreases when a voice interaction is attempted and thus the voice interaction becomes inaccurate. For example, when another occupant enters/exits the vehicle as shown in FIG. 6 or an interior noise level is high, a voice recognition rate decreases when a voice interaction is attempted. If a voice interaction is attempted when another occupant is lying down and sleeping or taking a rest, the sleep or rest of the other occupant may be affected and thus a speaker can lower his voice. When a state in which another occupant is in a horizontal position is detected according to a seat sensor signal, it can be determined that the other occupant is lying down and sleeping or taking a rest. When a voice interaction is attempted while another occupant is lying down, a voice recognition rate decreases.

The interaction determination module 75 can determine a voice interaction level as the full utterance available stage when a personal terminal has no call, a multimedia content request is not received, the angle of the back of a seat on which an occupant sits is less than a predetermined angle (or is minimum) and interior noise of the vehicle is less than the aforementioned reference value. The interaction controller 76 can increase the volume of the voice of the occupant received by the microphone of the vehicle 10 or a personal terminal and remove ambient noise of the speaker from a microphone signal to increase voice recognition sensitivity in the partial utterance available stage. The interaction controller 76 can decrease brightness of a display or narrow a viewing angle in the partial utterance available stage. The interaction controller 76 can output an interaction change notice message such as "Some of interaction settings will be changed because the current occupant state has changed. The volume, voice recognition sensitivity and display brightness will be changed" and a message for requesting confirmation of occupant's intention with respect to the change in settings, such as "will you allow the change?", to an occupant determined to be in the partial utterance available stage through a display, a speaker or the like in the vehicle or transmit the notice message to a personal terminal of the occupant. In addition, the interaction controller 76 can output an interaction change completion notice to an occupant determined to be in the partial utterance available stage through a display in the vehicle or vibration (or haptic), or transmit an interaction change completion message to a personal terminal of the occupant immediately after some of voice interaction settings are changed.

The full utterance available stage is a state in which a voice recognition rate is high when a voice interaction is attempted and thus there is no problem in voice recognition and perception.

The interaction controller 76 maintains current voice interaction settings in the full utterance stage.

The interaction controller 76 controls components of the cabin system in response to a command transmitted through a voice signal of an occupant to execute a service indicated by the command. The interaction controller 76 controls interaction settings as shown in FIG. 7 and an interaction method as shown in FIG. 8. In addition, the interaction controller 76 controls voice interaction change on the basis of determination results of the interaction determination module 75 as shown in FIG. 9.

The learning module 77 can receive and analyze a response of an occupant to a voice interaction for each occupant and improve the accuracy of voice interaction based on an interaction result history for each occupant and states of the vehicle and an occupant. The learning algorithm of the learning module 77 can be updated.

An occupant can set a personal terminal as a main voice interaction device or an auxiliary voice interaction device when the occupant reserves riding in the vehicle or at any time during vehicle driving.

When the personal terminal is set as the main voice interaction device, the personal terminal can generate a command code from a voice signal of the occupant and transmit the command code to the vehicle 10 through the communication device 300 to directly control the vehicle 10 such that a service is provided to the occupant. Accordingly, when the personal terminal is set as the main voice interaction device, the personal terminal instead of the interaction device of the vehicle can directly control the vehicle.

When the personal terminal is set as the auxiliary voice interaction device, the personal terminal is connected to the interaction device of the vehicle through the communication device 300 to transmit a voice signal of a user to the interaction device of the vehicle. When the personal terminal is set as the auxiliary voice interaction device, the personal terminal serves as a relay for transmitting a voice signal of an occupant to the vehicle. The interaction device of the vehicle recognizes a command from the voice signal of the occupant received through the personal terminal and provides a service to the occupant. When the personal terminal is set as the auxiliary voice interaction device, the personal terminal can amplify a voice signal of an occupant, remove noise from the voice signal and transmit the voice signal to the interaction device of the vehicle.

Services that can be provided by the vehicle refer to services for aiding in convenience of occupants. For example, a service of providing information such as driving information, positions at which occupants enter/exit the vehicle, news, weather and advertisement can be provided. In addition, a service of providing multimedia content such as music and video and products ordered by occupants may be provided.

FIG. 7 is a flowchart showing an interaction setting method using a personal terminal.

Referring to FIG. 7, an occupant or the AI agent 172 of the vehicle can set a personal terminal as the main voice interaction device or the auxiliary voice interaction device in an interaction setting step (S10 to S30). The AI agent 172 can set the personal terminal as the main voice interaction device or the auxiliary voice interaction device on the basis of learning results based on interaction satisfaction collected per occupant.

When the personal terminal is set as the main voice interaction device or the auxiliary voice interaction device, the personal terminal is connected to the vehicle through the communication device 300 (S21 and S31).

FIGS. 8 and 9 are flowcharts showing an interaction control method using a personal terminal in the full utterance available stage, the partial utterance available stage and the full utterance unavailable stage.

Referring to FIG. 8, the state change detection module 73 monitors states of the vehicle and occupants (S20). The occupant location inference module 74 determines a location of each occupant (S21).

The interaction determination module 75 can determine a voice interaction level as one of the full utterance available stage, the partial utterance available stage and the full utterance unavailable stage on the basis of the states of the vehicle and occupants (S22, S23 and S24). The voice interaction level may be inferred as the same stage for all occupants or inferred as different stages according to states of respective occupants.

In the full utterance available stage, the personal terminal can be set as the main voice interaction device (S25). In the full utterance available stage, an occupant can directly control the vehicle through the personal terminal to be provided with a desired service.

When an occupant attempts a voice interaction in the full utterance available stage, the vehicle can determine an utterance position and provide a service per occupant to the occupant (S26, S27 and S28).

In the full utterance available stage, occupants may request different services. For example, a first occupant may want to view a movie but a second occupant may want to listen to music. If the vehicle detects locations and utterance positions of occupants, it is possible to provide a desired service to each occupant without making other occupants uncomfortable. Accordingly, the vehicle can determine an utterance position, provide a desired service to only an occupant who requests the service, and provide different services to occupants in the full utterance available stage.

In the partial utterance available stage, the personal terminal is set as the auxiliary voice interaction device (S29). In the partial utterance available stage, a certain occupant can transmit a voice command to the vehicle through the personal terminal to be provided with a desired service.

In the partial utterance available stage, when an occupant attempts a voice interaction, the vehicle can determine an utterance position and provide a service per occupant to the occupant (S30, S31 and S32).

In the partial utterance available stage, occupants may request different services. For example, a first occupant may want to view a movie but a second occupant may want to listen to music. The vehicle can determine an utterance position, provide a desired service to only an occupant who requests the service, and provide different services to occupants in the partial utterance available stage.

In the full utterance unavailable stage, voice interaction is deactivated and video interaction is activated because an occupant cannot speak (S33). An occupant can be provided with a desired service through an interaction with the vehicle using the second display device 420, that is, an individual display, in the full utterance unavailable stage. The AI agent 172 can optimize individual interaction per occupant on the basis of learning results as shown in FIG. 9.

Referring to FIG. 9, the state change detection module 73 monitors states of the vehicle and occupants in real time (S40). The occupant location inference module 74 determines a location of each occupant (S41).

The interaction determination module 75 can determine a voice interaction per occupant as one of the full utterance available stage, the partial utterance available stage and the full utterance unavailable stage on the basis of the states of the vehicle and occupants (S42, S43 and S44).

A certain occupant may prefer a personal terminal as the main voice interaction device in the full utterance stage and the partial utterance stage. Further, a certain occupant may not want voice interaction but wants video interaction in any utterance stage.

The AI agent 172 can analyze responses to interactions collected per occupant to analyze individual satisfaction. The AI agent 172 can optimize individual interaction per occupant by checking whether voice interaction is activated and selecting main/auxiliary voice interaction settings of a personal terminal on the basis of learning results (S45 to S50).

FIG. 10 is a flowchart showing an interaction setting method using a personal terminal when an occupant rides in the vehicle.

Referring to FIG. 10, when an occupant rides in the vehicle, the interaction device of the vehicle detects riding on the basis of a camera image and a signal received from a personal terminal and search personal terminals carried by the occupant (S101 and S102). A signal of a personal terminal of the occupant is received by the vehicle through the communication device 300. The vehicle can read terminal information and reservation information of the occupant from the signal of the personal terminal of the occupant.

When a connectable personal terminal of the occupant is detected, the interaction controller 76 outputs a message such as "Currently connected auxiliary device is V20-Hong Gil Dong" through a display device in the vehicle or transmits the message to the personal terminal to indicate the detected personal terminal to the occupant.

When the occupant agrees to use the detected personal terminal as an interaction device, the personal terminal connection module 71 can read a wake-up word and commands from the personal terminal through the communication device 300 and store the wake-up word and commands in the memory of the vehicle to synchronize wake-up word and command records between the interaction device of the vehicle and the personal terminal (S103).

A wake-up word can be used to call the interaction device and a command can be used to instruct a service to be executed. The wake-up word can be independently set for each occupant. If many occupants use the same wake-up word and command, the occupants may be provided with undesired services.

The auxiliary interaction activation module 72 activates the personal terminal as a voice interaction assisting device between the vehicle and the occupant (S104). Here, the personal terminal can be set as the main interaction input device or the auxiliary interaction input device. The interaction controller 76 can output a notice message as a voice or video signal or transmit the notice message to the personal terminal to inform the occupant of available interaction.

If a connectable personal terminal of the occupant is not detected, a notice message such as "There is no currently connected AI interaction assisting device. Do you want to add a new assisting device?" through a voice or video signal or transmit the notice message to a personal terminal in the vehicle (S105). The personal terminal in the vehicle can be connected to the voice interaction device with the consent of the occupant.

Subsequently, the interaction device of the vehicle operates in a standby mode until the occupant attempts an interaction (S106). The occupant attempts an interaction with his wake-up word. When the occupant attempts a voice interaction with the vehicle (S107), the interaction device of the vehicle recognizes the wake-up word of the occupant to recognize the voice interaction attempt, and when the interaction target is the vehicle, executes a voice command of the occupant to provide a service (S108 and S109).

If the vehicle 10 fails in recognition of the wake-up word when the occupant attempts a voice interaction (S107), the personal terminal activated as the voice interaction assisting device assists the interaction to transmit a voice command of the occupant to the vehicle (S111 and S112). Here, the personal terminal may be a cellular phone carried by the occupant or a personal terminal in the vehicle. Here, the activated personal terminal can operate as the main interaction input device or the auxiliary interaction input device.

The personal terminal can transmit the voice command of the occupant to the vehicle 10 (S112). The personal terminal can receive a voice signal of the occupant and transmit the voice signal to the vehicle 10 or generate a command code of the occupant from the voice signal of the occupant and transmit the command code to the vehicle 10. The vehicle 10 can provide a service to the occupant in response to the voice command received through the personal terminal (S109).

After provision of the service to the occupant in response to the voice command of the occupant, the interaction controller 76 receives a response of the occupant to the service and delivers the response to the learning module 77. The learning module 77 analyzes collected responses of the occupant to infer individual satisfaction of the occupant and reflects the satisfaction in the next intersection setting (S113 and S114).

The interaction controller 76 separately executes interactions of occupants through inference of utterance points in the vehicle. For example, the interaction controller 76 can select a personal terminal or the second display device 420 of an occupant who attempts an interaction and provide a service and guidance to the occupant separately from other occupants. Accordingly, an interaction can be provided per occupant on the basis of an utterance position. For example, the vehicle can provide desired information or multimedia content of a first occupant to a personal terminal or the second display device of the first occupant in response to an interaction of the first occupant. Further, the vehicle can provide desired information or multimedia content of a second occupant adjacent to the first occupant to a personal terminal or the second display device of the second occupant in response to an interaction of the second occupant.

FIG. 11 is a flowchart showing a method of selecting an interaction target device on the basis of analysis of correlation between commands and service types in the interaction control method using a personal terminal.

Referring to FIG. 11, a command of an occupant can be input to the vehicle 10 through the microphone 214 (S201).

When the vehicle 10 fails in recognition of a wake-up word, a personal terminal of the occupant is activated as a voice interaction assisting device. When the vehicle does not recognize a wake-up word, the vehicle does not respond to a voice command of the occupant because the vehicle does not recognize a voice signal of the occupant as a command. The vehicle can respond to a voice command of the occupant received through the personal terminal because a wake-up word and commands have already been synchronized with the previously activated personal terminal in steps S103 and S104. The vehicle can recognize the voice command of the occupant even if the wake-up word is not recognized from a voice signal received through the previously activated personal terminal.

The interaction controller 75 checks whether the occupant who has attempted a voice interaction is using the personal terminal activated as the interaction assisting device on the basis of a signal received through the communication device 300 (S202).

If the occupant who has input the command is using the personal terminal activated as the interaction assisting device, the interaction controller 75 analyzes a correlation between the command of the occupant and a service provided in the personal terminal currently used by the occupant (S202 and S203).

The command is a voice command of the occupant who requests a service that can be provided in the vehicle. The vehicle and the personal terminal can simultaneously respond to the same command and provide the same service. To prevent this, the interaction controller 76 analyzes a correlation between the personal terminal (e.g., a cellular phone) currently used by the occupant and the voice command of the occupant to determine whether the command and the service belong to the same type (S203 to S207).

Commands and services can be classified into an information delivery type, a control type and a service type.

The information delivery type (S204) includes weather, traffic, local information, and the like. If the command of the occupant is a command for requesting a traffic situation of a certain area and the personal terminal currently used by the occupant is providing weather information, the command and the service belong to the same type and thus have a high correlation.

The control type (S205) includes telephone, text message, set value change, and the like. If the command of the occupant is a command related to telephone call and the personal terminal currently used by the occupant is providing a text message service, the command and the service belong to the same type and thus have a high correlation.

The service type (S206) includes a multimedia content service, a music play service, and the like. If the command of the occupant is a command related to movie playback and a movie playback application, for example, NETFLEX, is being executed in the personal terminal currently used by the occupant, the command and the service belong to the same type and thus have a high correlation.

When the voice command of the occupant and the current service of the personal terminal are of the same type, the personal terminal currently used by the occupant provides the corresponding service in response to the command (S207 and S208). In this case, the interaction controller 75 of the vehicle ignores the command of the occupant. For example, if the occupant who spoke the command says "Make a call" while using the text message service through the personal terminal, the personal terminal responds to the command to provide a telephone call service.

When the voice command of the occupant and the current service of the personal terminal are of different types, the vehicle provides the corresponding service in response to the command of the occupant (S207 and S210). In this case, the interaction controller 75 executes the command of the occupant and the personal terminal can ignore the command of the occupant. For example, if the occupant who spoke the command says "Play a movie" while using the text message service through the personal terminal, the vehicle can provide multimedia content to the second display device 420 close to the utterance position of the occupant or the personal terminal.

When the occupant does not use the personal terminal, the vehicle provides a service to the occupant in response to a command of a voice signal received from the occupant (S202, S209 and S210).

After provision of the service to the occupant in response to the voice command of the occupant, the interaction controller 76 receives a response of the occupant to the service and delivers the response to the learning module 77. The learning module 77 analyzes collected responses of the occupant to infer individual satisfaction of the occupant and reflects the satisfaction in the next interaction setting (S211 and S212).

FIG. 12 is a flowchart showing a method of changing interaction settings according to states of the vehicle and an occupant.

Referring to FIG. 12, the state change detection module 73 monitors change in the angle of the back of a seat on which an occupant sits, whether an occupant is calling, whether an occupant views multimedia content, an indoor space noise state of the vehicle, an occupant entering/exiting the vehicle, and the like in real time (S300 to S306). The angle of the back of a seat on which an occupant sits can be varied as shown in FIG. 13.

The interaction determination module 75 determines a voice interaction recognition level on the basis of change in states of the vehicle and occupants detected by the state change detection module 73 (S307). The voice interaction recognition level can be classified as the full utterance unavailable stage (S308), the partial utterance available stage (S311) or the full utterance stage (S314).

The full utterance unavailable stage (S308) is a state in which a voice interaction is impossible. The interaction determination module 75 infers an occupant who is calling, viewing multimedia content or lying and sleeping as an occupant who cannot perform utterance. The interaction determination module 75 can infer that an occupant is lying when the angle of the back of a seat on which the occupant sits increases to more than a predetermined angle by receiving a seat sensor signal and infer that the occupant is sleeping through face recognition using the camera 251.

When the interaction determination module 75 determines the voice interaction recognition level as the full utterance unavailable stages, the interaction controller 76 deactivates the voice interaction of the corresponding occupant, notifies the occupant of interaction setting change and receives acknowledgment (S309 and S310).

The interaction determination module 75 can infer the current voice interaction level as the partial utterance available stage when another occupant enters/exits the vehicle, interior noise is higher than a predetermined reference value, or another occupant is lying and the volume of the voice of the occupant attempting a voice interaction decreases (S311). In the partial utterance available stage (S311), a voice recognition rate decreases and thus the accuracy of voice interaction may be reduced.

The interaction controller 76 can change interaction settings in order to increase the voice recognition rate in the partial utterance available stage (S312). For example, the interaction controller 76 can increase voice recognition sensitivity by increasing the volume of the microphone 241, removing ambient noise of a speaker from a microphone signal or the like. The interaction controller 76 can change the brightness of a display to a predetermined brightness in the partial utterance available stage.

The interaction controller 76 can adjust instruments of the vehicle in the partial utterance available stage (S313). For example, the interaction controller 76 can rotate an individual display of an occupant, that is, the second display device 420, such that the back of the second display device 420 faces other occupants, as shown in FIGS. 14A and 14B, in order to prevent invasion of privacy of the occupant in the partial utterance available stage. FIG. 14A shows an example in which the back of a display of an occupant faces another occupant who is lying. FIG. 14B shows an example in which the back of a display of an occupant faces another occupant who is entering/exiting the vehicle.

The second display device 420 provided per seat can be connected to an electric system and rotated according to an electrical control signal. The viewing angle of the second display device 420 can be changed to a wide viewing angle or a narrow viewing angle in response to an electrical control signal.

The interaction controller 76 can narrow the viewing angle of the second display device 420 of an occupant in order to prevent invasion of privacy of the occupant in the partial utterance available stage. The interaction controller 76 can rotate the second display device 420 such that the back of the second display device 420 faces other occupants in order to prevent invasion of privacy of the occupant.

In the full utterance unavailable stages determined by the interaction determination module, the interaction controller 76 changes interaction settings, adjusts instruments of the vehicle, notifies the occupant of interaction setting change and receives acknowledgment (S311 to S313 and S310).

The interaction determination module 75 can infer the current interaction level as the full utterance available stage in which an interaction between the occupant and the vehicle is possible when the occupant is not calling, the occupant is not viewing multimedia content, the occupant is sitting or standing, or interior noise of the vehicle is less than the predetermined level (S414). The interaction controller 76 maintains voice interaction activation and current voice interaction settings in the full utterance stage.

After step S310 or S315, the interaction controller 76 receives a response of the occupant and delivers the response to the learning module 77. The learning module 77 analyzes collected responses of the occupant to infer individual satisfaction of the occupant and reflects the satisfaction in the next interaction setting (S316 and S317).

The voice interaction method and the vehicle using the same according to embodiments of the present invention can be described as follows.

A voice interaction method of the present invention includes: monitoring states of a vehicle and an occupant in real time; activating a personal terminal for receiving a voice signal of the occupant as a voice interaction assisting device between the vehicle and the occupant; and changing presence or absence of a voice interaction and voice interaction settings between the vehicle and the occupant according to the states of the vehicle and the occupant The voice interaction method further includes the personal terminal directly controlling functions of the vehicle in response to a voice command of the occupant.

The voice interaction method further includes: the personal terminal transmitting a voice signal of the occupant to the vehicle; and the vehicle providing a service to the occupant in response to a command of the voice signal of the occupant received from the personal terminal.

The voice interaction method further includes the personal terminal amplifying a voice signal of the occupant, removing ambient noise and transmitting the voice signal to the vehicle. The voice interaction method further includes: inferring a location and an utterance position of the occupant in the vehicle to identify the occupant attempting a voice interaction with the vehicle; and the vehicle providing a service requested through a voice of the occupant at the utterance position.

The voice interaction method further includes: receiving a response of the occupant to a service provided by the vehicle; and applying learning results obtained by analyzing the response of the occupant to voice interaction settings between the vehicle and the occupant.

The voice interaction method further includes: the vehicle searching for the personal terminal connectable to the vehicle through a communication channel when the occupant enters the vehicle; and synchronizing wake-up words and commands for a voice interaction between the vehicle and the occupant between the vehicle and the searched personal terminal.

The voice interaction method further includes: activating the searched personal terminal of the occupant as a voice interaction assisting device between the vehicle and the occupant; the vehicle responding to a voice command of the occupant when the vehicle recognizes a voice interaction attempt of the occupant; the activated personal terminal receiving a voice signal of the occupant and transmitting a command of the occupant to the vehicle when the vehicle does not recognize a voice interaction attempt of the occupant; and the vehicle responding to the command of the occupant received from the personal terminal.

The voice interaction method further includes: determining whether the occupant attempting a voice interaction with the vehicle is using a personal terminal activated as a voice interaction assisting device between the vehicle and the occupant; determining whether a service currently provided by the personal terminal activated as a voice interaction assisting device between the vehicle and the occupant and a voice command received from the occupant belong to the same type; the personal terminal responding to the voice command when the service currently provided by the activated personal terminal and the voice command from the occupant belong to the same type; and the vehicle responding to the voice command when the service currently provided by the activated personal terminal and the voice command from the occupant are of different types.

The voice interaction method of further includes: determining a voice interaction level between the vehicle and the occupant as a result of real-time monitoring of the states of the vehicle and the occupant, deactivating the voice interaction when the voice interaction level is determined to be a full utterance unavailable stage in which a voice interaction between the vehicle and the occupant is impossible, changing the voice interaction settings to increase the sensitivity of a voice signal of the occupant received by the vehicle or the personal terminal when the voice interaction level is determined to be a partial utterance available stage in which voice recognition accuracy is low in a voice interaction between the vehicle and the occupant; and activating the voice interaction and maintaining current voice interaction settings when the voice interaction level is determined to be a full utterance available stage in which a voice interaction between the vehicle and the occupant is possible.

The voice interaction level may be determined to be the full utterance unavailable stage in one of a state in which the personal terminal is connected to a call, a state in which the personal terminal receives a multimedia content request from the occupant, a state in which the angle of the back of a seat on which the occupant sits is greater than a predetermined angle, and a state in which the position of the occupant is horizontal.

The voice interaction level may be determined to be the partial utterance available stage in one of a state in which entering/existing of another occupant is detected, a state in which interior noise of the vehicle is greater than a predetermined reference value, and a state in which the angle of the back of a seat on which the other occupant sits is greater than the predetermined angle.

The voice interaction level may be determined to be the full utterance available stage in one of a state in which the personal terminal has no call, a state in which the multimedia content request is not present, and a state in which the angle of the back of the seat on which the occupant sits is less than the predetermined angle or the interior noise of the vehicle is equal to or less than the reference value.

The voice interaction method further includes adjusting a position of a personal display provided per occupant in the vehicle such that the back of the personal display faces another occupant in the partial utterance available stage.

A vehicle of the present invention includes: an interaction connection device connected to a personal terminal for receiving a voice signal of an occupant through a communication channel to activate the personal terminal as a voice interaction assisting device between the vehicle and the occupant; and a voice interaction device for monitoring states of the vehicle and the occupant in real time and changing presence or absence of a voice interaction and voice interaction settings between the vehicle and the occupant according to the states of the vehicle and the occupant.

The voice interaction device includes: a state change detection module for monitoring states of the vehicle and the occupant in real time; an occupant location inference module for determining a location of the occupant in the vehicle and an utterance position of the occupant attempting a voice interaction with the vehicle; an interaction determination module for determining a voice interaction level between the vehicle and the occupant according to the states of the vehicle and the occupant; and an interaction controller for controlling whether the personal terminal is activated as a voice interaction assisting device and the voice interaction settings according to the voice interaction level.

The voice interaction device further includes a learning module for applying learning results obtained by receiving and analyzing responses of the occupant collected after the vehicle provides a service requested through a voice of the occupant at the utterance position to voice interaction settings between the vehicle and the occupant.

The interaction connection device searches for the personal terminal connectable through a communication channel when the occupant entering the vehicle is detected, and the voice interaction device synchronizes wake-up words and commands for a voice interaction between the vehicle and the occupant between the vehicle and the searched personal terminal.

The interaction connection device activates the searched personal terminal of the occupant as a voice interaction assisting device between the vehicle and the occupant, and the voice interaction device responds to a voice command of the occupant when a voice interaction attempt of the occupant is recognized.

The voice interaction device receives a command received through the personal terminal and responds to the command upon failing in recognition of a wake-up word.

The voice interaction device determines whether the occupant attempting a voice interaction with the vehicle is using the personal terminal activated as a voice interaction assisting device, determines whether the current service of the personal terminal and the voice command of the occupant belong to the same type when the personal terminal activated as a voice interaction assisting device provides the current service, and responds to the voice command when the service currently provided in the activated personal terminal and the voice command of the occupant are of different types.

The personal terminal responds to the voice command when the service currently provided in the personal terminal activated as a voice interaction assisting device and the voice command of the occupant belong to the same type.

The voice interaction device deactivates the voice interaction when the voice interaction level is determined to be the full utterance unavailable stage in which a voice interaction between the vehicle and the occupant is impossible.

The voice interaction device changes the voice interaction settings to increase the sensitivity of a voice signal of the occupant received by the vehicle or the personal terminal when the voice interaction level is determined to be the partial utterance available stage in which voice recognition accuracy is low in a voice interaction between the vehicle and the occupant.

The voice interaction device activates the voice interaction and maintains current voice interaction settings when the voice interaction level is determined to be the full utterance available stage in which a voice interaction between the vehicle and the occupant is possible.

The voice interaction device determines the voice interaction level as the full utterance unavailable stage when the occupant is calling, viewing multimedia content or lying.

The voice interaction device determines the voice interaction level as the partial utterance available stage when another occupant enters/exits the vehicle, interior noise of the vehicle is greater than a predetermined reference value or another occupant is lying.

The voice interaction device determines the voice interaction level as the full utterance available stage when the occupant is not calling, the occupant is not viewing multimedia content, the occupant is sitting or standing, or the interior noise of the vehicle is equal to or greater than the reference value.

The present invention can be implemented with computer-readable code in a computer-readable recording medium. The computer-readable medium may include all kinds of recording devices capable of storing data readable by a computer system. A computer may include a processor or a controller. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

The voice interaction method and the vehicle using the same according to the above-described embodiments can improve convenience of occupants. The present invention is applicable to self-driving or semi-self-driving of the vehicle according to the above-described embodiments.

The above described features, configurations, effects, and the like are included in at least one of the implementations of the present disclosure, and should not be limited to only one implementation. In addition, the features, configurations, effects, and the like as illustrated in each implementation may be implemented with regard to other implementations as they are combined with one another or modified by those skilled in the art. Thus, content related to these combinations and modifications should be construed as being included in the scope of the accompanying claims.

Further, although the implementations have been mainly described until now, they are just exemplary and do not limit the present disclosure. Thus, those skilled in the art will understand that various modifications and applications which have not been exemplified may be carried out within a range which does not deviate from the essential characteristics of the implementations. For instance, the constituent elements described in detail in the exemplary implementations can be modified to be carried out. Further, the differences related to such modifications and applications shall be construed to be included in the scope of the present disclosure specified in the attached claims.

MODE FOR INVENTION

A voice interaction method of the present invention includes: monitoring states of a vehicle and an occupant in real time; activating a personal terminal for receiving a voice signal of the occupant as a voice interaction assisting device between the vehicle and the occupant; and changing presence or absence of a voice interaction and voice interaction settings between the vehicle and the occupant according to the states of the vehicle and the occupant.

INDUSTRIAL APPLICABILITY

The present invention can improve the accuracy of a voice interaction between an occupant and a vehicle using a personal terminal of the occupant as a voice interaction assisting device in the voice interaction between the occupant and the vehicle.

The invention claimed is:
1. A voice interaction method comprising:
monitoring states of a vehicle and an occupant in real time;
activating a personal terminal for receiving a voice signal of the occupant as a voice interaction assisting device between the vehicle and the occupant;
changing voice interaction settings between the vehicle and the occupant according to the states of the vehicle and the occupant; and
determining a voice interaction level between the vehicle and the occupant as a result of real-time monitoring of the states of the vehicle and the occupant,
wherein the voice interaction level is classified, based on voice recognition accuracy, as (i) a full utterance unavailable state in which a voice interaction between the vehicle and the occupant is impossible, (ii) a partial utterance available state in which the voice recognition accuracy is low in a voice interaction between the vehicle and the occupant, or (iii) a full utterance available state in which a voice interaction between the vehicle and the occupant is possible.
2. The voice interaction method of claim 1, further comprising the personal terminal directly controlling functions of the vehicle in response to a voice command of the occupant.
3. The voice interaction method of claim 1, further comprising:
the personal terminal transmitting a voice signal of the occupant to the vehicle; and
the vehicle providing a service to the occupant in response to a command of the voice signal of the occupant received from the personal terminal.
4. The voice interaction method of claim 1, further comprising the personal terminal amplifying a voice signal of the occupant, removing ambient noise and transmitting the voice signal to the vehicle.
5. The voice interaction method of claim 1, further comprising:
an occupant identification step of inferring a location and an utterance position of the occupant in the vehicle and attempting a voice interaction with the vehicle; and
the vehicle providing a service requested through a voice of the occupant at the utterance position.
6. The voice interaction method of claim 1, further comprising:
receiving a response of the occupant to a service provided by the vehicle; and
applying learning results obtained by analyzing the response of the occupant to voice interaction settings between the vehicle and the occupant.
7. The voice interaction method of claim 1, further comprising:
the vehicle searching for the personal terminal connectable to the vehicle through a communication channel based on the occupant entering the vehicle; and
synchronizing wake-up words and commands for a voice interaction between the vehicle and the occupant between the vehicle and the searched personal terminal.
8. The voice interaction method of claim 7, further comprising:
activating the searched personal terminal of the occupant as a voice interaction assisting device between the vehicle and the occupant;
the vehicle responding to a voice command of the occupant based on the vehicle recognizing a voice interaction attempt of the occupant;
the activated personal terminal receiving a voice signal of the occupant and transmitting a command of the occupant to the vehicle based on the vehicle not recognizing a voice interaction attempt of the occupant; and
the vehicle responding to the command of the occupant received from the personal terminal.
9. The voice interaction method of claim 7, further comprising:
determining whether the occupant attempting a voice interaction with the vehicle is using a personal terminal activated as a voice interaction assisting device between the vehicle and the occupant;
determining whether a service currently provided by the personal terminal activated as a voice interaction assisting device between the vehicle and the occupant and a voice command received from the occupant belong to the same type;
the personal terminal responding to the voice command based on a determination that the service currently provided by the activated personal terminal and the voice command from the occupant belong to the same type; and
the vehicle responding to the voice command based on a determination that the service currently provided by the activated personal terminal and the voice command from the occupant are of different types.
10. The voice interaction method of claim 1, further comprising:
deactivating the voice interaction based on a determination that the voice interaction level is the full utterance unavailable state;
changing the voice interaction settings to increase a sensitivity of a voice signal of the occupant received by the vehicle or the personal terminal based on a determination that the voice interaction level is the partial utterance available state; and activating the voice interaction and maintaining current voice interaction settings based on a determination that the voice interaction level is the full utterance available state.

11. The voice interaction method of claim 1, wherein the full utterance unavailable state includes one of a state in which the personal terminal is connected to a call, a state in which the personal terminal receives a multimedia content request from the occupant, a state in which an angle of a back of a seat on which the occupant sits is greater than a predetermined angle, and a state in which a position of the occupant is horizontal.

12. The voice interaction method of claim 1, wherein the partial utterance available state includes at least one of a state in which entering/existing of another occupant is detected, a state in which interior noise of the vehicle is greater than a predetermined reference value, and a state in which an angle of a back of a seat on which the other occupant sits is greater than a predetermined angle.

13. The voice interaction method of claim 1, wherein the full utterance available state includes at least one of a state in which the personal terminal has no call, a state in which a multimedia content request is not present, and a state in which an angle of a back of a seat on which the occupant sits is less than a predetermined angle or interior noise of the vehicle is equal to or less than a reference value.

14. The voice interaction method of claim 1, further comprising adjusting a position of a personal display provided per occupant in the vehicle such that a back of the personal display faces another occupant in the partial utterance available state.

15. A vehicle comprising:
an interaction connection device connected to a personal terminal for receiving a voice signal of an occupant through a communication channel to activate the personal terminal as a voice interaction assisting device between the vehicle and the occupant; and
a voice interaction device for monitoring states of the vehicle and the occupant in real time and changing voice interaction settings between the vehicle and the occupant according to the states of the vehicle and the occupant,
wherein the voice interaction device is further configured to determine a voice interaction level between the vehicle and the occupant as a result of real-time monitoring of the states of the vehicle and the occupant,
wherein the voice interaction level is classified, based on voice recognition accuracy, as (i) a full utterance unavailable state in which a voice interaction between the vehicle and the occupant is impossible, (ii) a partial utterance available state in which the voice recognition accuracy is low in a voice interaction between the vehicle and the occupant, or (iii) a full utterance available state in which a voice interaction between the vehicle and the occupant is possible.

16. The vehicle of claim 15, wherein the voice interaction device comprises:
a state change detection module for monitoring states of the vehicle and the occupant in real time;
an occupant location inference module for determining a location of the occupant in the vehicle and an utterance position of the occupant attempting a voice interaction with the vehicle;
an interaction determination module for determining the voice interaction level between the vehicle and the occupant according to the states of the vehicle and the occupant; and
an interaction controller for controlling whether the personal terminal is activated as a voice interaction assisting device and the voice interaction settings according to the voice interaction level.

17. The vehicle of claim 16, wherein the voice interaction device further comprises a learning module for applying learning results obtained by receiving and analyzing responses of the occupant collected after the vehicle provides a service requested through a voice of the occupant at the utterance position to voice interaction settings between the vehicle and the occupant.

18. The vehicle of claim 15, wherein the interaction connection device searches for the personal terminal connectable through a communication channel based on detection the occupant entering the vehicle, and the voice interaction device synchronizes wake-up words and commands for a voice interaction between the vehicle and the occupant between the vehicle and the searched personal terminal.

19. The vehicle of claim 15, wherein the interaction connection device activates the searched personal terminal of the occupant as a voice interaction assisting device between the vehicle and the occupant, and the voice interaction device responds to a voice command of the occupant based on recognition of a voice interaction attempt of the occupant.

* * * * *